(12) United States Patent
Dahlman et al.

(10) Patent No.: US 12,484,001 B2
(45) Date of Patent: Nov. 25, 2025

(54) METHODS FOR DETERMINING A MUTING PATTERN OF SSB TRANSMISSION FOR IAB NODE MEASUREMENT

(71) Applicant: Telefonaktiebolaget LM Ericsson (publ), Stockholm (SE)

(72) Inventors: Erik Dahlman, Stockholm (SE); Yezi Huang, Täby (SE); Boris Dortschy, Vendelsö (SE); Lei Bao, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 707 days.

(21) Appl. No.: 17/765,677

(22) PCT Filed: Oct. 5, 2020

(86) PCT No.: PCT/SE2020/050947
§ 371 (c)(1),
(2) Date: Mar. 31, 2022

(87) PCT Pub. No.: WO2021/066736
PCT Pub. Date: Apr. 8, 2021

(65) Prior Publication Data
US 2022/0346044 A1      Oct. 27, 2022

Related U.S. Application Data

(60) Provisional application No. 62/910,624, filed on Oct. 4, 2019.

(51) Int. Cl.
*H04W 56/00*      (2009.01)
*H04L 5/00*       (2006.01)
*H04W 88/08*      (2009.01)

(52) U.S. Cl.
CPC ......... *H04W 56/001* (2013.01); *H04L 5/0053* (2013.01); *H04W 88/08* (2013.01)

(58) Field of Classification Search
CPC ............... H04W 56/001; H04W 88/08; H04W 56/0015; H04L 5/0053; H04B 7/15528
See application file for complete search history.

(56) References Cited

U.S. PATENT DOCUMENTS

2015/0304888 A1* 10/2015 Masini ................ H04W 28/085
                                                        370/254
2020/0107383 A1*  4/2020 Novlan ................ H04W 76/15
(Continued)

FOREIGN PATENT DOCUMENTS

WO      2020225369 A1     11/2020
WO      2020225639 A1     11/2020

OTHER PUBLICATIONS

International Search Report and Written Opinion dated Feb. 22, 2021 for International Application No. PCT/SE2020/050947 filed Oct. 5, 2020; consisting of 13 pages.
(Continued)

*Primary Examiner* — Sharmin Chowdhury
(74) *Attorney, Agent, or Firm* — Weisberg I.P. Law, P.A.

(57) ABSTRACT

Methods and apparatuses are disclosed for determining a muting pattern of a synchronization signal block (SSB) transmission for Integrated Access and Backhaul (IAB) node measurement. In one embodiment, a network node is configured to indicate a first muting pattern, the indication of the first muting pattern indicating at least one first synchronization signal block, SSB, transmission opportunity associated with SSB transmission configuration, STC, that is mutable by an Integrated Access Backhaul, IAB, node. In one embodiment, a network node is configured to determine a first muting pattern, the first muting pattern indicating at least one SSB transmission opportunity associated with a
(Continued)

STC that is mutable by the network node; and mute the at least one first SSB transmission opportunity according to the determined first muting pattern.

18 Claims, 13 Drawing Sheets

(56) References Cited

U.S. PATENT DOCUMENTS

| | | | | |
|---|---|---|---|---|
| 2021/0143959 A1* | 5/2021 | Xu | ............... | H04W 8/005 |
| 2021/0345321 A1* | 11/2021 | Wu | ............... | H04W 16/10 |
| 2022/0141686 A1* | 5/2022 | Korhonen | ............ | H04L 5/0048 |
| | | | | 370/252 |
| 2022/0174630 A1* | 6/2022 | Wei | ............... | H04W 56/0015 |
| 2022/0217661 A1* | 7/2022 | Yokomakura | ......... | H04B 7/155 |

OTHER PUBLICATIONS

3GPP TSG-RAM WG1 #96-Bis R1-1904832; Title: SSB-based IAB node discovery and measurement; Agenda Item: 7.2.3.1; Source: Ericsson; Document for: Discussion; Date and Location: Apr. 8-12, 2019, Xi'an, China; consisting of 8 pages.

3GPP TSG RAN WG1 Meeting #97; Title: RAN1 Chairman's Notes; Date and Location: May 13-17, 2019, Reno, USA; consisting of 103 pages.

3GPP TSG RAN WG1 Meeting #98; Title: RAN1 Chairman's Notes; Date and Location: Aug. 26-30, 2019, Prague, CZ; consisting of 113 pages.

3GPP TSG RAN WG1 Meeting #96; Title: RAN1 Chairman's Notes; Date and Location: Feb. 25-Mar. 1, 2019, Athens, Greece; consisting of 120 pages.

3GPP TS 38.470 V15.6.0; 3rd Generation Partnership Project; Technical Specification Group Radio Access Network; NG-RAN; F1 general aspects and principles (Release 15); Jul. 2019; consisting of 13 pages.

3GPP TSG RAN WG1 Meeting #96bis; Title: RAN1 Chairman's Notes; Date and Location: Apr. 8-12, 2019, Xi'an, China; consisting of 108 pages.

3GPP TR 38.874 V16.0.0; 3rd Generation Partnership Project; Technical Specification Group Radio Access Network; NR; Study on Integrated Access and Backhaul; (Release 16); Dec. 2018; consisting of 111 pages.

3GPP TSG-RAN WG1 #97 R1-1906589; Title: SSB-based IAB node discovery and measurement; Agenda Item: 7.2.3.1; Source: Ericsson; Document for: Discussion; Date and Location: May 13-17, 2019, Reno, USA; consisting of 8 pages.

3GPP TSG RAN WG1 Meeting #97 R1-1906000; Title: SSB-based discovery and measurement for IAB; Agenda Item: 7.2.3.1; Source: Huawei, HiSilicon; Document for: Discussion and Decision; Date and Location: May 13-17, 2019, Reno, USA; consisting of 5 pages.

3GPP TSG RAN WG1 Meeting #96bis R1-1905832; Title: Summary of 7.2.3.1 Extensions of SSBs for inter-IAB-node discovery and measurements; Agenda Item: 7.2.3.1; Source: Huawei, HiSilicon; Document for: Discussion and Decision; Date and Location: Apr. 8-12, 2019, Xi'An, China; consisting of 4 pages.

3GPP TSG RAN WG1 #96bis R1-1904290; Title: SSBs for Inter-IAB Node Discovery and Measurements; Agenda tem: 7.2.3.1; Source: Intel Corporation; Document for: Discussion and decision; Date and Location: Apr. 8-12, 2019, Xi-an, China; consisting of 5 pages.

3GPP TSG RAN WG1 #98 R1-1908629; Title: SSBs for Inter-IAB-Node Discovery and Measurements; Agenda Item: 7.2.3.1; Source: Intel Corporation; Document for: Discussion and decision; Date and Location: Aug. 26-30, 2019, Prague, Czech; consisting of 4 pages.

European Extended Search Report dated Sep. 29, 2023 for Application No. 20871012.9, consisting of 10 pages.

3GPPTSG RAN WG1 Ad-Hoc Meeting 1901; R1-1900032; Title: SSB-based discovery and measurement for IAB; Agenda Item: 7.2.3.2; Source: Huawei, HiSilicon; Document for: Discussion and Decision; Location and Date: Taipei, Jan. 21-25, 2019, consisting of 7 pages.

3GPP TSG RAN WG1 #96; R1-1902328; Title: Discussions on extensions of SSBs for inter-IAB-node discovery and measurements; Document for: Discussion and Decision; Location and Date: Athens, Greece, Feb. 25-Mar. 1, 2019, consisting of 3 pages.

3GPP TSG-RAN WG1 #98bis R1-1910901; Title: SSB-based IAB node discovery and measurement; Agenda Item: 7.2.3.1; Document for: Discussion; Location and Date: Chongqing, China, Oct. 14-20, 2019, consisting of 8 pages.

3GPP TS 38.470 V15.5.0; 3rd Generation Partnership Project; Technical Specification Group Radio Access Network; NG-RAN; F1 general aspects and principles (Release 15); Mar. 2019; consisting of 13 pages.

\* cited by examiner

METHODS FOR DETERMINING A MUTING PATTERN OF SSB TRANSMISSION FOR IAB NODE MEASUREMENT

CROSS-REFERENCE TO RELATED APPLICATIONS

This application is a Submission Under 35 U.S.C. § 371 for U.S. National Stage Patent Application of International Application No.: PCT/SE2020/050947, filed Oct. 5, 2020 entitled "METHODS FOR DETERMINING A MUTING PATTERN OF SSB TRANSMISSION FO IAB NODE MEASUREMENT," which claims priority to U.S. Provisional Application No. 62/910,624, filed Oct. 4, 2019, entitled "METHODS FOR DETERMINING A MUTING PATTERN OF SSB TRANSMISSION FOR IAB NODE MEASUREMENT," the entireties of both of which are incorporated herein by reference.

TECHNICAL FIELD

The present disclosure relates to wireless communication and in particular, to arrangements for determining a muting pattern of a synchronization signal block (SSB) transmission for Integrated Access and Backhaul (IAB) node measurement.

BACKGROUND

Integrated Access and Backhaul (IAB) is to be introduced in Third Generation Partnership Project (3GPP) New Radio (NR) (also called 5th Generation or 5G) in which a central unit—distributed unit (CU-DU) split provides, e.g., flexible and dense deployment of NR cells without proportionately densifying the transport network. FIG. 1 illustrates an example of an IAB deployment in which multiple IAB network nodes are wirelessly connected. The IAB donor network node provides wireless devices (WDs) with an interface (e.g., user equipments/UEs interface) to the core network, and wireless backhauling functionality to IAB network nodes. An IAB network node is a radio access network (RAN) node that supports wireless access to WDs and wirelessly backhauls the access traffic.

Each IAB network node, as well as the IAB donor network node, may create one or multiple cells to which WDs, as well as other IAB network nodes, can connect.

In general, within NR, the transmission from the cell site of so-called synchronization signal/physical broadcast channel (i.e., SS/PBCH blocks or SSBs) are used by WDs to:
- initially find a cell to connect to; and
- discover and measure on neighbor cells.

The SSB periodicity can take different values. Within one period, the SSBs can be transmitted in a burst. The maximum number (L) of SSBs in one burst (confined in one half frame) may be determined by the sub-carrier spacing (SCS). For frequency range from 6 GHz to 52.6 GHz, L can be as large as 64, for example.

An SSB is transmitted over four consecutive orthogonal frequency division multiplexed (OFDM) symbols and may include at least three parts as follows:
- A primary synchronization signal (PSS) from which a WD can synchronize in time and frequency to the cell transmitting the SSB;
- A secondary synchronization signal (SSS) from which a WD can eventually acquire the physical cell identity (PCI) of the cell transmitting the SSB; and
- A Physical Broadcast Channel (PBCH) which includes a very limited amount of system information (SI) that a WD uses before the WD can connect to the cell. The main part of this information is included in what is known as the Master Information Block (MIB).

With the introduction of IAB in 3GPP NR Release 16 (Rel-16) it is expected that IAB network nodes will also use SSBs transmitted from IAB donor network nodes or other IAB network nodes to find cells to access, and for neighbor network node/cell discovery and measurement.

According to an IAB Study Item (SI) (e.g., 3GPP Technical Report (TR) 38.874 version (V) 16.0.0, Study on Integrated Access and Backhaul), the backhaul link discovery and measurement may be performed in two stages:
- Stage 1: initial IAB-node discovery which follows the same Release 15 (Rel-15) initial access procedure; and
- Stage 2: inter-IAB-node discovery and measurement.

There are at least two SSB-based solutions for IAB inter-node measurement being considered, which in the design may take into account the half-duplex constraint at an IAB-node and multi-hop topologies.

Extract from TR 38.874
SSB-based solutions (Solution 1-A and 1-B):
Solution 1-A) Reusing the same set of SSBs used for access WDs: In this case, the SSBs for inter-IAB cell search in stage 2 are on the currently defined sync raster for a standalone (SA) frequency layer, while for a non-standalone (NSA) frequency layer the SSBs are transmitted inside of the SSB Measurement Timing Configuration (SMTC) configured for access WDs.
Solution 1-B) Using SSBs which are orthogonal (time division multiplexing (TDM) and/or frequency division multiplexing (FDM)) with SSBs used for access WDs. In this case, the SSBs, that may get muted, for inter-IAB cell search and measurement in stage 2 are not on the currently defined sync raster for a SA frequency layer, while for a NSA frequency layer the SSBs are transmitted outside of the SMTC configured for access WDs.

An IAB-node should generally not mute its own SSB transmissions targeting the WD cell search and measurement when performing inter-IAB cell search in stage 2:
For SA, this may mean that SSBs transmitted on the currently defined sync raster follow the currently defined periodicity for initial access;
In case of Solution 1-B, this may imply that SSBs, that may get muted, for inter-IAB stage 2 cell search is at least TDM with SSBs used for WD cell search and measurements.

End extract from TR 38.874 [6]

Solution 1-A which uses the on-raster SSBs is already supported by the current 3GPP Release 15 (Rel-15) technical specification. As presented in TR 38.874, additional flexibility in the SSB configuration can be introduced to the off-raster SSBs used in Solution 1-B, for example, to allocate additional time-domain positions on a channel raster for SSB transmission. One option is to support transmission of off-raster SSB in any half-frame and within multiple half frames.

In an IAB network node, the Mobile-Termination (MT) function (also called IAB-MT) is a logic unit which terminates the backhaul radio interface toward the IAB parent network node. The IAB-DU function (also referred to as DU) establishes the Radio Link Control (RLC) connection to MTs of the IAB child network nodes and WDs. In parallel to SSB transmission by the DU, WDs and MTs are configured to search for and measure on SSBs at specific time instances. The DU and MT configuration may be jointly configured to enable inter-node SSB measurements while not violating the half-duplex constraint.

Integrated Access Backhaul Architectures

It has also been considered in the 3GPP SI (e.g., 3GPP Technical Report (TR) 38.874 version (V) 16.0.0, Study on Integrated Access and Backhaul) that the IAB system architecture may apply the CU-DU split. FIG. 2 shows an example reference diagram for IAB in standalone mode, which includes one IAB-donor and multiple IAB-nodes.

Currently in 3GPP, different architectures for supporting user plane (UP) traffic over TAB network nodes has been captured in, for example, 3GPP Technical Specification (TS) 38.874, namely architecture groups 1 and 2. Of these architectures, option 1a is being considered and an example is depicted in FIG. 3.

Architecture 1a leverages the CU/DU-split architecture. FIG. 3 shows an example reference diagram for a two-hop chain of IAB-nodes underneath an IAB-donor, where the IAB-node and WD connects in SA-mode to a 5G Next Generation Core (NGC).

In this architecture, each IAB-node holds a Mobile Termination (MT) and a Distributed Unit (DU). In an TAB network node, the MT function is a logic unit which terminates the backhaul radio interface toward the IAB parent node. Via the MT, the IAB-node connects to an upstream IAB-node or the TAB-donor. Via the DU, the IAB-node establishes RLC-channels to WDs and to MTs of downstream IAB-nodes. For MTs, this RLC-channel may refer to a modified RLC*. An IAB-node can connect to more than one upstream IAB-node or TAB-donor DU. The IAB-node may include multiple DUs, but each DU part of the IAB-node has an F1-C (control plane protocol) connection only with one TAB-donor central unit-control plane (CU-CP).

As illustrated in FIG. 3, the IAB donor network node (also called "IAB donor" or "TAB-donor") may also include a DU to support WDs and MTs of downstream IAB-nodes. The TAB-donor may include a CU for the DUs of all IAB-nodes and for its own DU. It may be assumed that the DUs on an IAB-node are served by only one TAB-donor. This TAB-donor network node may change through topology adaptation. Each DU of an IAB-node connects to the CU in the TAB-donor using an F1 interface, potentially in a modified form version, which is referred to as F1*. F1*-U may run over RLC channels on the wireless backhaul between the MT on the serving IAB-node and the DU on the donor IAB node. An adaptation layer may be added, which holds routing information, enabling forwarding. It replaces the Internet Protocol (IP) functionality of the standard F1-stack. F1*-U may carry a General Packet Radio Service (GPRS) Tunneling Protocol-user plane (GTP-U) header for the end-to-end association between the CU and the DU. In a further enhancement, information carried inside the GTP-U header may be included into the adaption layer. Further, optimizations to RLC may be considered such as applying automatic repeat request (ARQ) only on the end-to-end connection opposed to hop-by-hop. The right side of FIG. 3 shows two examples of such F1*-U protocol stacks. In FIG. 3, enhancements of RLC are referred to as RLC*. The MT of each IAB-node further sustains non-access stratum (NAS) connectivity to the NGC, e.g., for authentication of the IAB-node. The MT may further sustain a packet data unit-session (PDU-session) via the NGC, e.g., to provide the IAB-node with connectivity to the Operation, Administration, Management (OAM) function.

For NSA operation with the Evolved Packet Core (EPC), the MT may be dual-connected with the network using Evolved-Universal Terrestrial Radio Access (E-UTRAN) New Radio-Dual Connectivity (EN-DC). The IAB-node's MT may sustain a Packet Data Network (PDN) connection with the Evolved Packet Core (EPC), e.g., to provide the IAB-node with connectivity to the OAM functionality.

Details of F1*, the adaptation layer and RLC* are being considered in 3GPP.

Extract from TS 38.470

Scheduling of system broadcast information is carried out in the gNB-DU. The gNB-DU is responsible for transmitting the system information according to the scheduling parameters available.

The gNB-DU is responsible for the encoding of NR-MIB. In case broadcast of SIB1 and other SI messages is needed, the gNB-DU is responsible for the encoding of SIB1 and the gNB-CU is responsible for the encoding of other SI messages.

End extract from TS 38.470

SUMMARY

Some embodiments advantageously provide methods, systems, and apparatuses for determining a muting pattern of a synchronization signal block (SSB) transmission for Integrated Access and Backhaul (IAB) node measurement.

In one embodiment, a method implemented in a network node includes one or more of: indicating a first muting pattern corresponding to a synchronization signal block (SSB) transmission configuration (STC); indicating a second muting pattern, the second muting pattern based at least in part on the first muting pattern; and/or receiving an indication of a third muting pattern, the third muting pattern based at least in part on at least one of the indicated second muting pattern and the first muting pattern.

In one embodiment, a method implemented in a network node includes one or more of: receiving an indication of a first muting pattern corresponding to a synchronization signal block (SSB) transmission configuration (STC); receiving an indication of a second muting pattern, the second muting pattern based at least in part on the first muting pattern; and/or determining a third muting pattern, the third muting pattern based at least in part on at least one of the indicated second muting pattern and the first muting pattern.

According to an aspect of the present disclosure, a method implemented by a network node is provided. The method includes indicating a first muting pattern, the indication of the first muting pattern indicating at least one first synchronization signal block, SSB, transmission opportunity associated with SSB transmission configuration, STC, that is mutable by an Integrated Access Backhaul, IAB, node.

In some embodiments of this aspect, the indication of the first muting pattern is provided by at least one muting attribute in the STC. In some embodiments of this aspect, the STC further indicates at least one second SSB transmission opportunity associated with the STC that is not to be muted. In some embodiments of this aspect, the at least one first SSB transmission opportunity associated with the STC that is mutable by the IAB node is overlapping in time with at least one first SSB measurement opportunity associated with an SSB measurement timing configuration, SMTC, for the IAB node.

In some embodiments of this aspect, the indication of the first muting pattern indicates a conditional priority for the at least one first SSB transmission opportunity associated with the STC relative to at least one first SSB measurement opportunity associated with an SSB measurement timing configuration, SMTC; the at least one first SSB transmission opportunity overlapping in time with the at least one first SSB measurement opportunity; and the conditional priority is based at least in part on a measurement requirement. In some embodiments of this aspect, the at least one first SSB transmission opportunity indicated to have the conditional priority is associated with inter-IAB node cell search or node measurement.

In some embodiments of this aspect, the indication of the first muting pattern indicates an absolute priority for the at least one first SSB transmission opportunity associated with the STC relative to at least one first SSB measurement opportunity associated with an SSB measurement timing configuration, SMTC; the at least one first SSB transmission opportunity overlapping in time with the at least one first SSB measurement opportunity; and the absolute priority not being based on a measurement requirement. In some embodiments of this aspect, the at least one first SSB transmission opportunity indicated to have the absolute priority is associated with cell search by user equipments, UEs. In some embodiments of this aspect, the network node is one of an operations administration and management, OAM, node and a donor IAB node. In some embodiments of this aspect, the method further includes determining the first muting pattern based at least in part on a second muting pattern.

In some embodiments of this aspect, determining the first muting pattern is further based on a relation of SSB transmission opportunities and SSB measurement opportunities associated with a plurality of IAB nodes. In some embodiments of this aspect, determining the first muting pattern is further based on at least one event associated with a muting permission. In some embodiments of this aspect, the at least one event associated with the muting permission corresponds to an overlap in time between the at least one first SSB transmission opportunity and at least one first SSB measurement opportunity associated with an SSB measurement timing configuration, SMTC.

In some embodiments of this aspect, the at least one event associated with the muting permission corresponds to at least one of a network change and a state change. In some embodiments of this aspect, the method further includes determining an SSB measurement timing configuration, SMTC, based at least in part on the first muting pattern. In some embodiments of this aspect, the method further includes negotiating a configuration of the first muting pattern with the IAB node. In some embodiments of this aspect, the method further includes receiving an indication of a third muting pattern. In some embodiments of this aspect, the indication of the third muting pattern is a notification from the IAB node indicating the third muting pattern used by the IAB node. In some embodiments of this aspect, the method further includes receiving an indication of the second muting pattern, the indication of the second muting pattern being a configuration by an operations administration and management, OAM, node.

According to an aspect of the present disclosure, a method implemented by a network node is provided. The method includes determining a first muting pattern, the first muting pattern indicating at least one first synchronization signal block, SSB, transmission opportunity associated with a SSB transmission configuration, STC, that is mutable by the network node; and muting the at least one first SSB transmission opportunity according to the determined first muting pattern.

In some embodiments of this aspect, the at least one first SSB transmission opportunity associated with the STC that is mutable by the network node is overlapping in time with at least one first SSB measurement opportunity associated with an SSB measurement timing configuration, SMTC. In some embodiments of this aspect, the method further includes receiving an indication of a priority of the at least one first SSB transmission opportunity associated with the STC relative to at least one first SSB measurement opportunity associated with an SSB measurement timing configuration, SMTC. In some embodiments of this aspect, the priority is a conditional priority based at least in part on a measurement requirement.

In some embodiments of this aspect, the at least one first SSB transmission opportunity indicated to have the conditional priority is associated with inter-IAB node cell search or node measurement. In some embodiments of this aspect, the priority is an absolute priority that is not based on a measurement requirement. In some embodiments of this aspect, the at least one first SSB transmission opportunity indicated to have the absolute priority is associated with cell search by user equipments, UEs. In some embodiments of this aspect, the method further includes receiving an indication of a second muting pattern; and determining the first muting pattern is based at least in part on the second muting pattern, the second muting pattern indicating the at least one first SSB transmission opportunity associated with the STC that can be muted by the network node.

In some embodiments of this aspect, the second muting pattern is based at least in part on at least one of a relation of SSB transmission opportunities and SSB measurement opportunities associated with a plurality of IAB nodes and at least one event associated with a muting permission. In some embodiments of this aspect, determining the first muting pattern is based further on a third muting pattern, the third muting pattern indicated in the STC. In some embodiments of this aspect, the second muting pattern is different from and based at least in part on the third muting pattern.

In some embodiments of this aspect, determining the first muting pattern is based further on at least one of a measurement requirement, a traffic demand and an operating condition. In some embodiments of this aspect, the method further includes indicating the first muting pattern used by the network node to mute the at least one first SSB transmission opportunity to a second network node. In some embodiments of this aspect, the method further includes negotiating a configuration of the first muting pattern with the second network node. In some embodiments of this aspect, the network node is an Integrated Access Backhaul, IAB, node comprising a mobile termination, MT, function and a distributed unit, DU, function, and the MT and DU functions are associated with a half-duplex constraint for SSB transmissions.

According to yet another aspect of the present disclosure, a network node is provided. The network node includes processing circuitry. The processing circuitry is configured to cause the network node to indicate a first muting pattern, the indication of the first muting pattern indicating at least one first synchronization signal block, SSB, transmission opportunity associated with an SSB transmission configuration, STC, that is mutable by an Integrated Access Backhaul, IAB, node. In some embodiments of this aspect, the indication of the first muting pattern is provided by at least one muting attribute in the STC.

In some embodiments of this aspect, the STC further indicates at least one second SSB transmission opportunity associated with the STC that is not to be muted. In some embodiments of this aspect, the at least one first SSB transmission opportunity associated with the STC that is mutable by the IAB node is overlapping in time with at least one first SSB measurement opportunity associated with an SSB measurement timing configuration, SMTC, for the IAB node. In some embodiments of this aspect, the indication of the first muting pattern indicates a conditional priority for the at least one first SSB transmission opportunity associated with the STC relative to at least one first SSB measurement opportunity associated with an SSB measurement timing configuration, SMTC; the at least one first SSB transmission opportunity overlapping in time with the at least one first SSB measurement opportunity; and the conditional priority is based at least in part on a measurement requirement.

In some embodiments of this aspect, the at least one first SSB transmission opportunity indicated to have the conditional priority is associated with inter-IAB node cell search or node measurement. In some embodiments of this aspect, the indication of the first muting pattern indicates an absolute priority for the at least one first SSB transmission opportunity associated with the STC relative to at least one first SSB measurement opportunity associated with an SSB measurement timing configuration, SMTC; the at least one first SSB transmission opportunity overlapping in time with the at least one first SSB measurement opportunity; and the absolute priority is not based on a measurement requirement.

In some embodiments of this aspect, the at least one first SSB transmission opportunity indicated to have the absolute priority is associated with cell search by user equipments, UEs. In some embodiments of this aspect, the network node is one of an operations administration and management, OAM, node and a donor IAB node. In some embodiments of this aspect, the processing circuitry is further configured to cause the network node to determine the first muting pattern based at least in part on a second muting pattern. In some embodiments of this aspect, the processing circuitry is configured to determine the first muting pattern further based on a relation of SSB transmission opportunities and SSB measurement opportunities associated with a plurality of IAB nodes.

In some embodiments of this aspect, the processing circuitry is configured to determine the first muting pattern further based on at least one event associated with a muting permission. In some embodiments of this aspect, the at least one event associated with the muting permission corresponds to an overlap in time between the at least one first SSB transmission opportunity and at least one first SSB measurement opportunity associated with an SSB measurement timing configuration, SMTC. In some embodiments of this aspect, the at least one event associated with the muting permission corresponds to at least one of a network change and a state change.

In some embodiments of this aspect, the processing circuitry is configured to cause the network node to determine an SSB measurement timing configuration, SMTC, based at least in part on the first muting pattern. In some embodiments of this aspect, the processing circuitry is further configured to cause the network node to negotiate a configuration of the first muting pattern with the IAB node. In some embodiments of this aspect, the processing circuitry is further configured to cause the network node to receive an indication of a third muting pattern. In some embodiments of this aspect, the indication of the third muting pattern is a notification from the IAB node indicating the third muting pattern used by the IAB node. In some embodiments of this aspect, the processing circuitry is further configured to cause the network node to receive an indication of the second muting pattern, the indication of the second muting pattern being a configuration by an operations administration and management, OAM, node.

According to another aspect of the present disclosure, a network node is provided. The network node includes processing circuitry. The processing circuitry is configured to cause the network node to determine a first muting pattern, the first muting pattern indicating at least one first synchronization signal block, SSB, transmission opportunity associated with a SSB transmission configuration, STC, that is mutable by the network node; and mute the at least one first SSB transmission opportunity according to the determined first muting pattern.

In some embodiments of this aspect, the at least one first SSB transmission opportunity associated with the STC that is mutable by the network node is overlapping in time with at least one first SSB measurement opportunity associated with a SSB measurement timing configuration, SMTC. In some embodiments of this aspect, the processing circuitry is further configured to cause the network node to receive an indication of a priority of the at least one first SSB transmission opportunity associated with the STC relative to at least one first SSB measurement opportunity associated with an SSB measurement timing configuration, SMTC.

In some embodiments of this aspect, the priority is a conditional priority based at least in part on a measurement requirement the at least one first SSB transmission opportunity indicated to have the conditional priority is associated with inter-IAB node cell search or node measurement. In some embodiments of this aspect, the priority is an absolute priority that is not based on a measurement requirement. In some embodiments of this aspect, the at least one first SSB transmission opportunity indicated to have the absolute priority is associated with cell search by user equipments, UEs. In some embodiments of this aspect, the processing circuitry is further configured to cause the network node to receive an indication of a second muting pattern; and determine the first muting pattern based at least in part on the second muting pattern, the second muting pattern indicating the at least one first SSB transmission opportunity associated with the STC that can be muted by the network node.

In some embodiments of this aspect, the second muting pattern is based at least in part on at least one of a relation of SSB transmission opportunities and SSB measurement opportunities associated with a plurality of IAB nodes and at least one event associated with a muting permission. In some embodiments of this aspect, the processing circuitry is further configured to cause the network node to determine the first muting pattern based further on a third muting pattern, the third muting pattern indicated in the STC. In some embodiments of this aspect, the second muting pattern is different from and based at least in part on the third muting pattern. In some embodiments of this aspect, the processing circuitry is further configured to cause the network node to determine the first muting pattern based further on at least one of a measurement requirement, a traffic demand and an operating condition. In some embodiments of this aspect, the processing circuitry is further configured to cause the network node to indicate the first muting pattern used by the network node to mute the at least one first SSB transmission opportunity to a second network node. In some embodiments of this aspect, the processing circuitry is further configured to cause the network node to negotiate a configuration of the first muting pattern with the second network node. In some embodiments of this aspect, the network node is an Integrated Access Backhaul, IAB, node comprising a mobile termination, MT, function and a distributed unit, DU, function, and the MT and DU functions are associated with a half-duplex constraint for SSB transmissions.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Several challenges exist regarding the inter-node measurement in an IAB network. First, due to the half-duplex constraint, an IAB network node is not permitted (due to e.g., implementation/product limitation) to transmit and measure SSBs at the same time. In order to enable inter-node measurement in an IAB network, the IAB network nodes may use different time-domain SSB transmission patterns that provide timewise orthogonal opportunities for SSB measurements.

From the detectability point of view, each IAB node may somehow have orthogonal time-domain transmission (e.g., SSB transmission by the DU) and reception patterns (e.g., SSB reception and measurement by the MT). However, a large number of non-overlapping patterns may require many SSB-based measurement timing configuration (SMTC) windows. In a RAN1 #96b is meeting, it was considered that, for example, "the maximum number of SMTC windows that can be configured for an IAB network node is 4". How MTs/IAB nodes can efficiently measure multiple IAB network nodes (i.e., inter-IAB node measurements) with a limited number of SMTC windows (e.g., IAB node can be configured with a maximum of 4 SMTC windows) is a complex optimization problem. In addition, it has also considered that, for example: 1) muting Type 1-B SSB transmission could be one solution if there is a collision between SSB transmission (e.g., at a DU) and SSB measurement (e.g., at an MT); and/or 2) it is an IAB internal decision on whether to prioritize SSB transmission or measurement when there is a collision.

This may imply that in principle an IAB network node can mute any Type 1-B SSB transmission when it is time-wise overlapped with an SSB measurement (e.g., at the same IAB network node). Muting SSB transmission of a certain IAB network node may cause a negative impact to other nodes that are currently measuring this IAB network node. However, how to limit the impact of such muting is not clear. At the same time, periodic SSB transmissions are resource demanding. From the resource efficiency point-of-view, it may be desirable to support more general muting permissions than SSB measurements.

In general, if there is no information exchange between a Network-function (NW) and the IAB network nodes on the muting patterns, it may be challenging for both the IAB-DU to make a proper decision on how many and which SSB transmissions to mute, as well as, the donor-CU to perform efficient SSB measurement configurations (e.g., SSB Measurement Timing Configuration or SMTC) to the IAB nodes that the donor supports. Also, how to implement flexible prioritization rules between SSB transmission configuration (STC) and SSB Measurement Timing Configuration (SMTC) is also addressed by some embodiments of the present disclosure.

Figure 1:
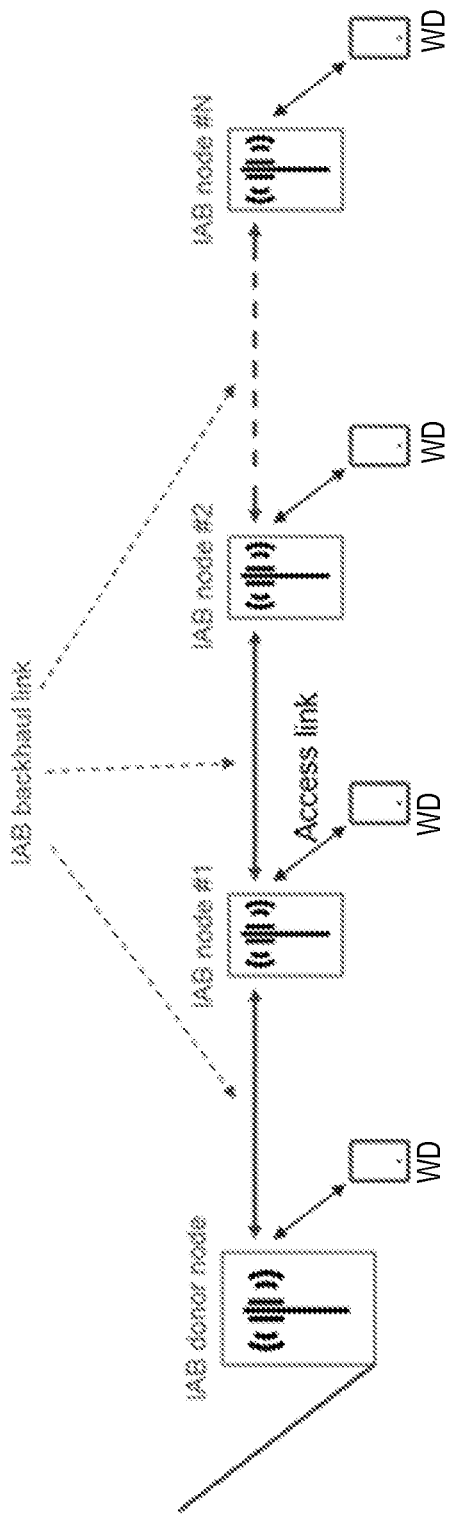
FIG. 1 illustrates an example of an IAB network.
Figure 2:
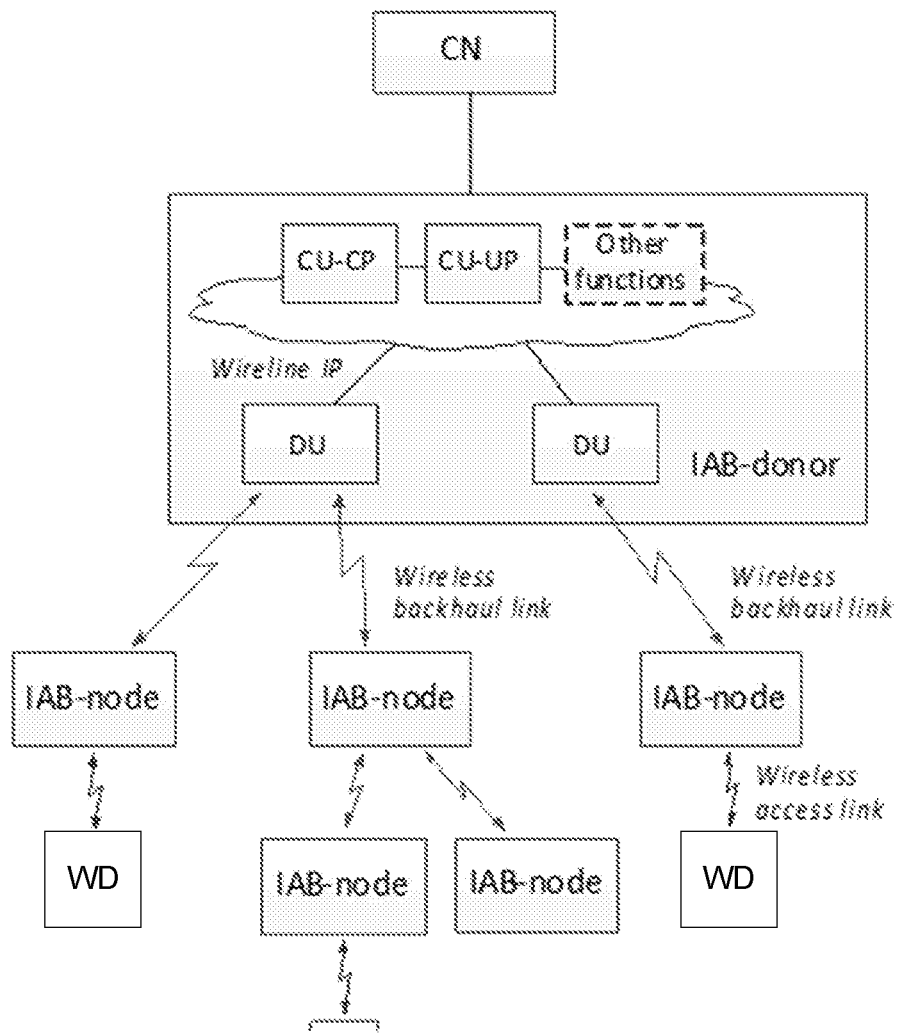
FIG. 2 illustrates an example reference diagram for IAB-architectures (SA mode)
Figure 3:
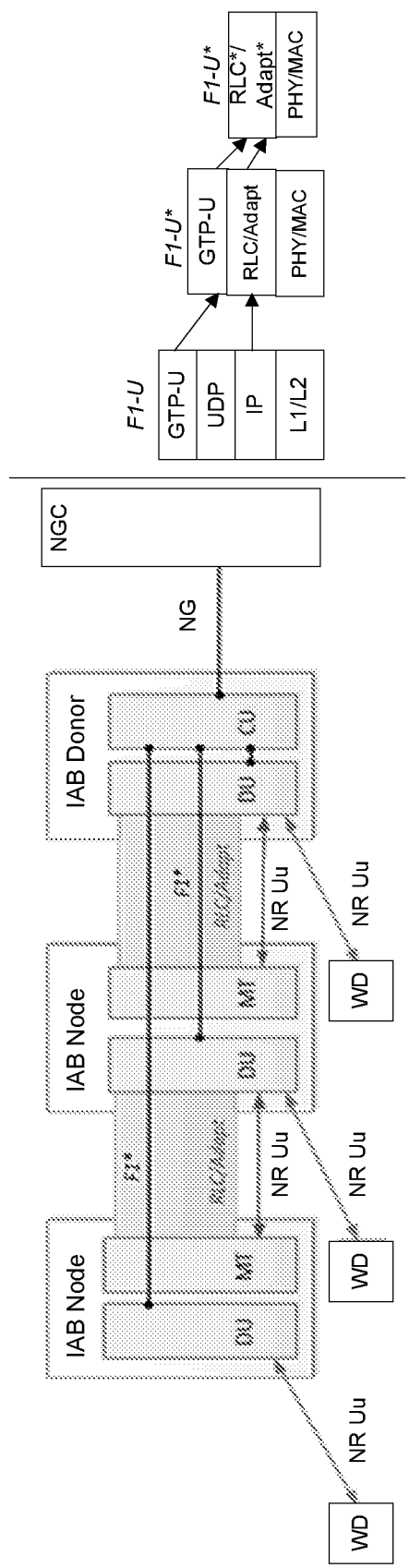
FIG. 3 illustrates an example reference diagram for architecture 1a (SA-mode with NGC)

Some embodiments of the present disclosure propose arrangements to determine the SSB transmission muting pattern for an IAB network node in, e.g., a coordinated manner. Some embodiments include the IAB donor-CU and IAB node-DU (see e.g., FIG. 3) refining an initial muting pattern configured by the OAM, based on information and/or improved knowledge (as compared to existing arrangements) in regards to e.g., neighbor cell relations, muting-triggering events, IAB node capability and/or network conditions. Signaling of muting patterns (e.g., via F1* signaling) may be introduced in some embodiments between the IAB donor-CU and IAB node-DU for intra-CU node measurements, as well as between donor-CUs for inter-CU node measurements.

Some embodiments provide an iterative method to determine a coordinated (e.g., as between OAM, IAB donor node and/or IAB network nodes) muting pattern for an IAB network node. Some purposes of the determination of a muting pattern may include one or more of: 1) to better assist the IAB donor-CU to coordinate SSB measurement configurations; 2) to support the IAB node-DU to fulfil the measurement requirements; and/or 3) to enable the IAB node-DU to make better use of idle resources.

According to some embodiments, a primary muting pattern is configured by the OAM which defines the range of SSBs that can potentially be muted and/or the SSBs that are not permitted to be muted. At the IAB donor-CU, the primary muting pattern may be refined based on diverse events that trigger muting and/or the relations between neighbor IAB network nodes. In some embodiments, the IAB donor-CU may have good knowledge about its child IAB-nodes and can efficiently coordinate their time domain SSB transmission/measurement patterns.

In some embodiments, in a last phase of such muting pattern coordination, the IAB node-DU can further downselect the muting pattern and make a last or final determination/decision on a muting pattern based on the IAB node's capability and to fulfill certain requirements (e.g., SSB measurement requirements) or traffic demands in one or more cells supported by the IAB node. Letting the IAB donor-CU and IAB node-DU jointly in a coordinated manner determine the muting pattern (e.g., time domain indication of SSBs that are permitted to be muted, SSBs that are not permitted to be muted, i.e., are required to be transmitted, etc.) may greatly reduce the network uncertainty due to muted SSB transmissions. Such functional enhancement may simplify the coordination of SSB transmission and measurement among multiple nodes in the network. It may also be useful to assist an IAB node-DU to make coordinated muting decisions and set up a proper measurement plan. Sensible and fair muting decisions may ensure mutual inter-node measurement work among a group of IAB network nodes, especially when co-scheduling of more IAB network nodes improves the efficiency of inter-node measurements.

Before describing in detail exemplary embodiments, it is noted that the embodiments reside primarily in combinations of apparatus components and processing steps related to arrangements for determining a muting pattern of a synchronization signal block (SSB) transmission for Integrated Access and Backhaul (IAB) node measurement. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of an integrated access and backhaul (IAB) node (e.g., IAB donor node, IAB child node, IAB parent node, etc.), relay node, donor node controlling relay. The network node may comprise any units or functions (e.g., donor-CU, IAB-DU, NF, CF, MT, OAM, etc.) discussed herein, which may be included in and/or be part of one or more IAB nodes. The network node may comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE). The network node may comprise any of a radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB network node, relay node, access point, radio access point, Remote Radio Unit (RRU) Remote Radio Head (RRH).

In some embodiments, the half-duplex constraint may be considered a constraint related to an IAB node including a DU and an MT in which the DU is not permitted (due to e.g., a capability limitation) to transmit SSB (e.g., for WD cell search) at the same time that the MT receives an SSB (e.g., for inter-IAB node measurement). An IAB node transmits SSBs for WD to perform cell search and for other IAB nodes to perform cell search and node measurement. An IAB node receives SSBs from other IAB nodes to perform node measurement.

Due to half-duplex constraint, an IAB node cannot transmit and receive SSBs at the same time; in other words, an IAB node cannot measure other IAB nodes and be measured by other IAB nodes at the same time.

In some embodiments, the term "mute/muting/mutable" may indicate that one or more SSBs/SSB transmission opportunities indicated by an SSB transmission configuration (STC), which STC is configured to an IAB node-DU, are not transmitted by the IAB node-DU based at least in part on e.g., the half-duplex constraint.

In some embodiments, the term "muting pattern" may indicate information, such as configuration information, indicating muting permissions or instructions associated with one or more SSBs/SSB transmission opportunities indicated by an STC; such muting permissions or instructions defining a muting pattern may include one or more of: permitted to be muted, conditionally permitted to be muted based on certain factors and/or requirements, not allowed to be muted at all, conditionally prioritized relative to a time-wise overlapping SSB measurement opportunity and/or absolutely prioritized relative to a time-wise overlapping SSB measurement opportunity regardless of certain other conditions, requirements and/or factors.

Any two or more embodiments described in this disclosure may be combined in any way with each other.

The term "radio measurement" used herein may refer to any measurement performed on radio signals, such as inter-IAB node measurements of SSB transmissions. Radio measurements can be absolute or relative. Radio measurement may be called as signal level which may be signal quality and/or signal strength. Radio measurements can be e.g. intra-frequency, inter-frequency, inter-RAT measurements, CA measurements, etc. Radio measurements can be unidirectional (e.g., DL or UL) or bidirectional (e.g., Round Trip Time (RTT), Receive-Transmit (Rx-Tx), etc.). Some examples of radio measurements: timing measurements (e.g., Time of Arrival (TOA), timing advance, RTT, Reference Signal Time Difference (RSTD), Rx-Tx, propagation delay, etc.), angle measurements (e.g., angle of arrival), power-based measurements (e.g., received signal power, Reference Signals Received Power (RSRP), received signal quality, Reference Signals Received Quality (RSRQ), Signal-to-interference-plus-noise Ratio (SINR), Signal Noise Ratio (SNR), interference power, total interference plus noise, Received Signal Strength Indicator (RSSI), noise power, etc.), cell detection or cell identification, radio link monitoring (RLM), system information (SI) reading, etc.

Receiving (or obtaining) information may comprise receiving one or more information messages (e.g., indications). It may be considered that receiving signaling comprises demodulating and/or decoding and/or detecting, e.g. blind detection of, one or more messages, e.g. based on an assumed set of resources, which may be searched and/or listened for.

An indication (e.g., an indication of a muting pattern, of a STC, SMTC, a priority, muting attribute, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bits or bit patterns representing the information.

Configuring a radio node, in particular a function or unit of an IAB network node, may refer to the radio node being adapted or caused or set and/or instructed to operate according to the configuration. Configuring may be done by another device, e.g., a parent IAB network node or a core network node, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Generally, configuring may include determining configuration data representing the configuration and providing, e.g. transmitting, it to one or more other nodes (parallel and/or sequentially), which may transmit it further to the radio node (or another node, which may be repeated until it reaches a destination node). Alternatively, or additionally, configuring a radio node, e.g., by an IAB parent network node or other core network node, may include receiving configuration data and/or data pertaining to configuration data, e.g., from another node like an upstream IAB network node or core network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2/Xn interface.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), WLAN (802.11 family), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for determining a muting pattern of a synchronization signal block (SSB) transmission for Integrated Access and Backhaul (IAB) node measurement.

Figure 4:
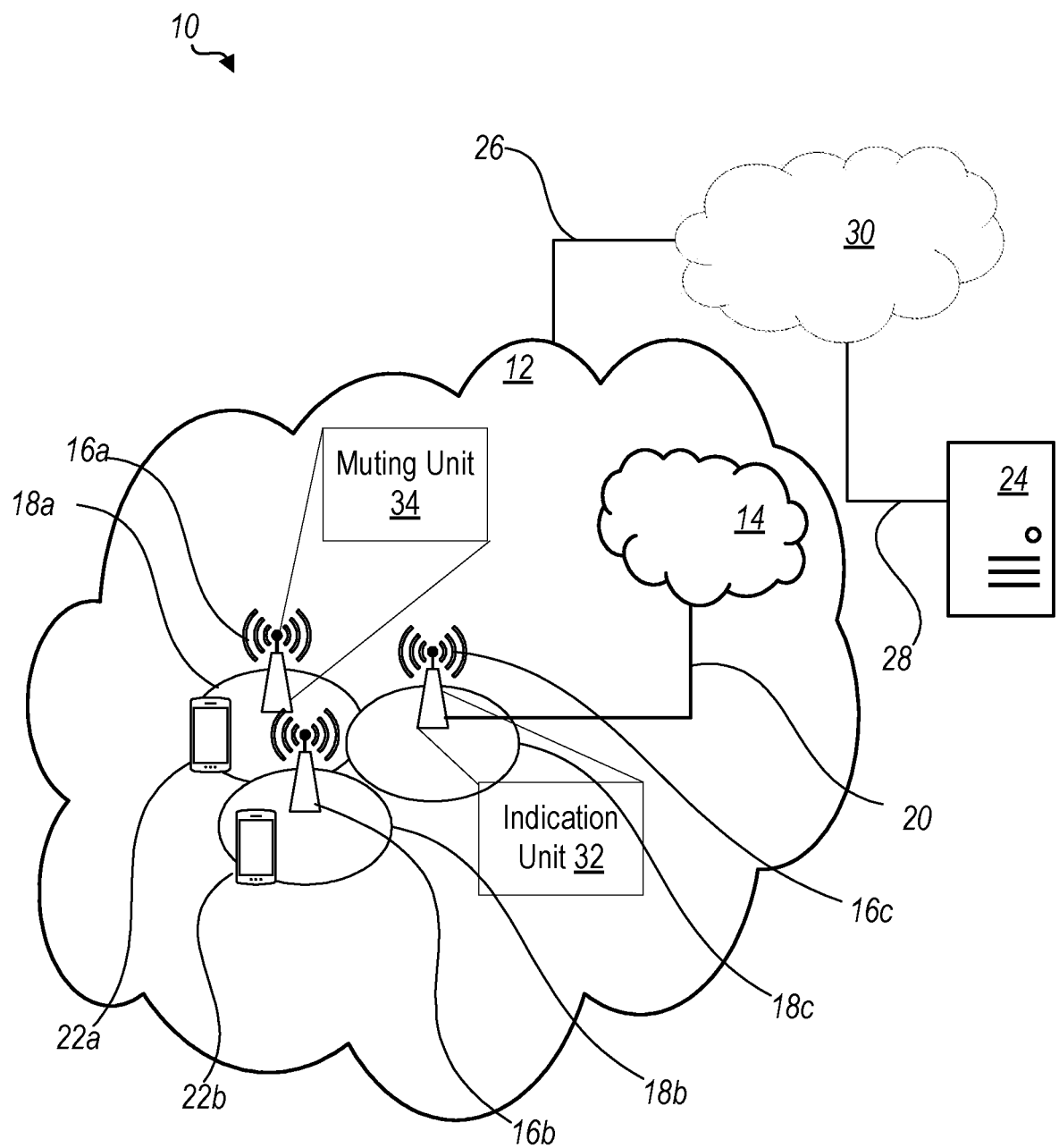
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 (e.g., an OAM function or a donor-CU residing in a node or distributed in nodes, or any other network node) is configured to include an indication unit 32 which is configured to indicate a first muting pattern, the indication of the first muting pattern indicating at least one first synchronization signal block, SSB, transmission opportunity associated with SSB transmission configuration, STC, that is mutable by an Integrated Access Backhaul, IAB, node. In some embodiments, network node 16 is configured to include an indication unit 32 which is configured to one or more of: indicate a first muting pattern corresponding to a synchronization signal block (SSB) transmission configuration (STC); indicate a second muting pattern, the second muting pattern based at least in part on the first muting pattern; and/or receive an indication of a third muting pattern, the third muting pattern based at least in part on at least one of the indicated second muting pattern and the first muting pattern.

A network node 16 (e.g., a donor-CU or a IAB-DU or any other network node) is configured to include a muting unit 34 which is configured to determine a first muting pattern, the first muting pattern indicating at least one first synchronization signal block, SSB, transmission opportunity associated with a SSB transmission configuration, STC, that is mutable by the network node; and mute the at least one first SSB transmission opportunity according to the determined first muting pattern. In some embodiments, the network node 16 is configured to include a muting unit 34 which is configured to one or more of: receive an indication of a first muting pattern corresponding to a synchronization signal block (SSB) transmission configuration (STC); receive an indication of a second muting pattern, the second muting pattern based at least in part on the first muting pattern; determine a third muting pattern, the third muting pattern based at least in part on at least one of the indicated second muting pattern and the first muting pattern; and/or mute (e.g., apply a muting pattern to SSB transmission and/or measurement) an SSB transmission according to the determined third muting pattern.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include indication unit 32 configured to perform network node methods discussed herein, such as the methods discussed with reference to FIG. 10 as well as other figures.

In another embodiment, the processing circuitry 68 of the network node 16 may include muting unit 34 configured to perform network node methods discussed herein, such as the methods discussed with reference to FIG. 11 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 5:
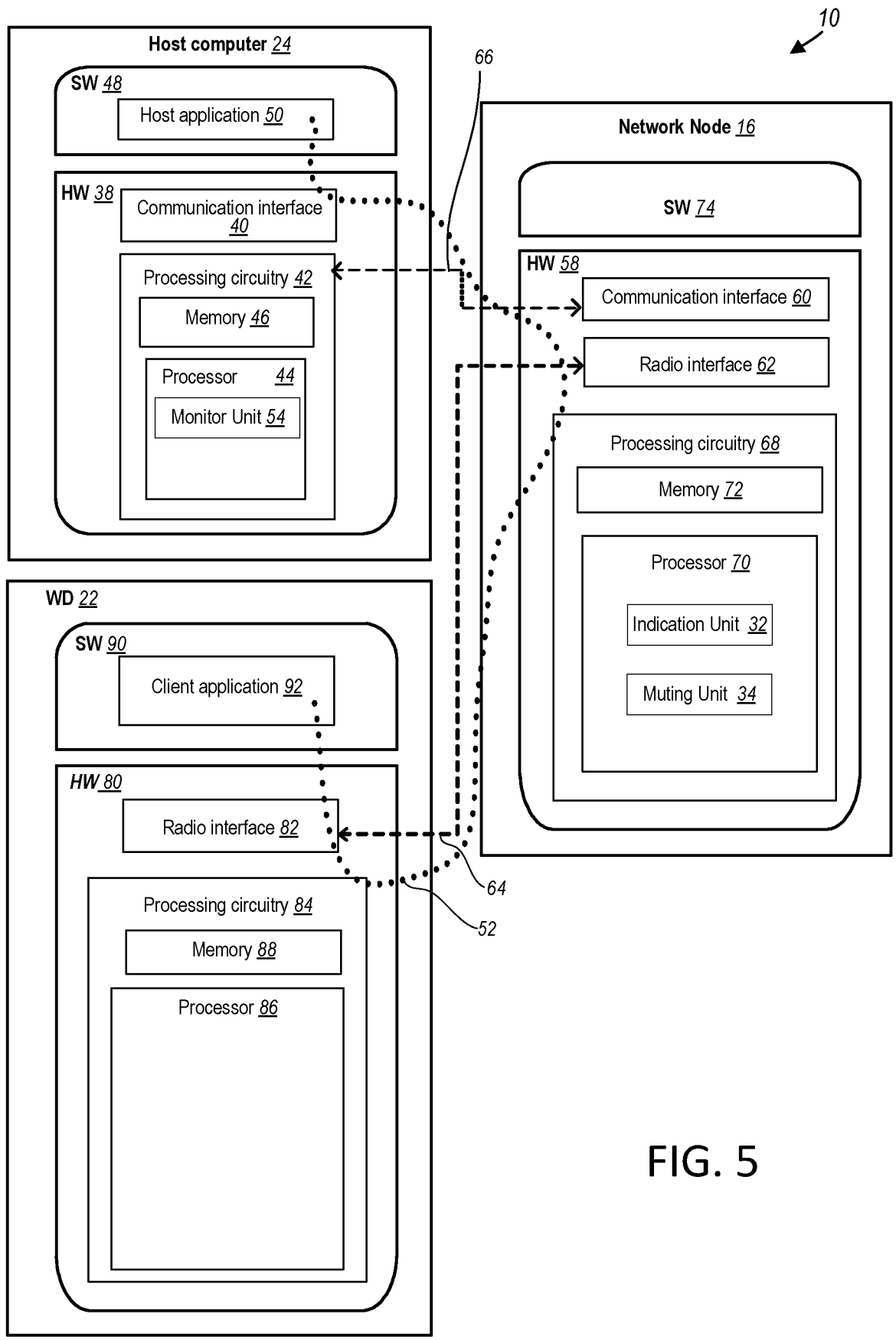
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as indication unit 32, and muting unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 6, 7:
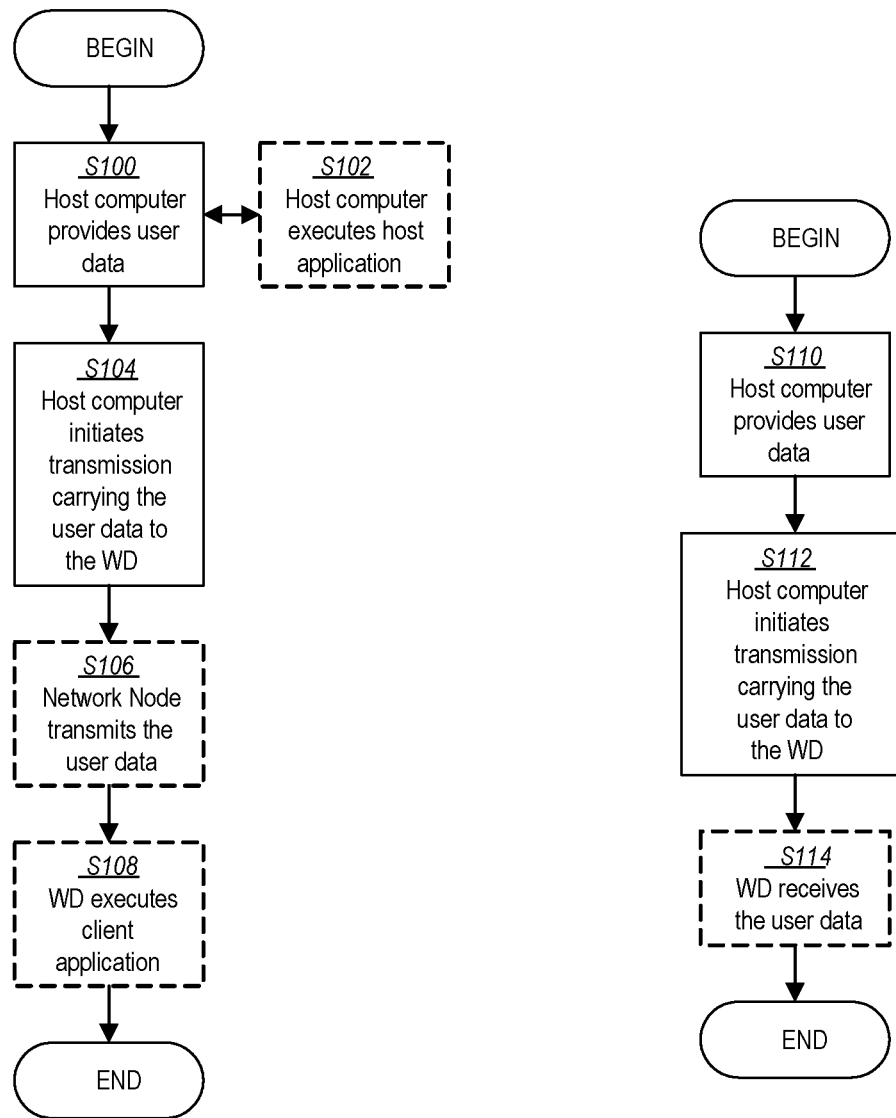
FIG. 6 is a flowchart illustrating exemplary methods implemented in a communication system including a host computer, a network node and a wireless device for executing a client application at a wireless device according to some embodiments of the present disclosure.
FIG. 7 is a flowchart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 8:
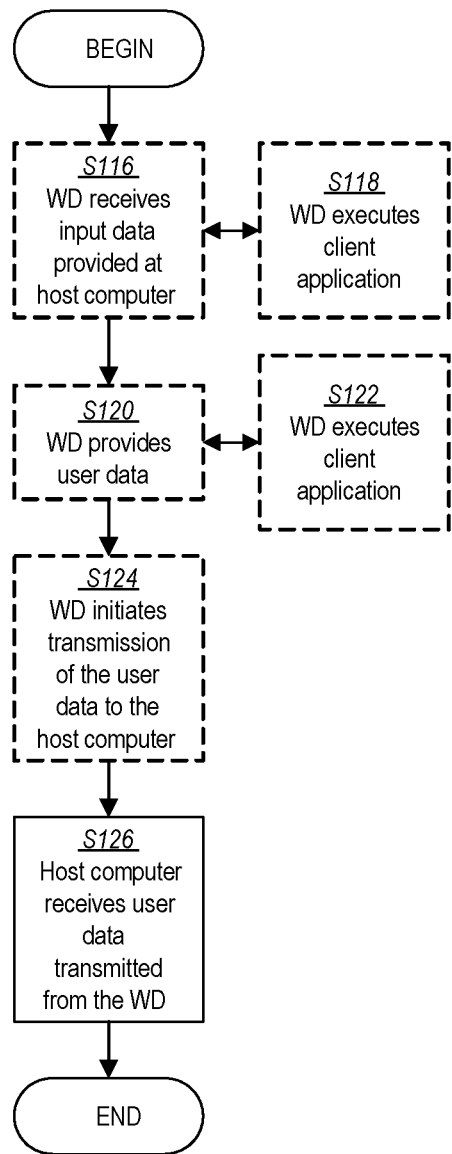
FIG. 8 is a flowchart illustrating exemplary methods implemented in a communication system including a host computer, a network node and a wireless device for receiving user data from the wireless device at a host computer according to some embodiments of the present disclosure.

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 9:
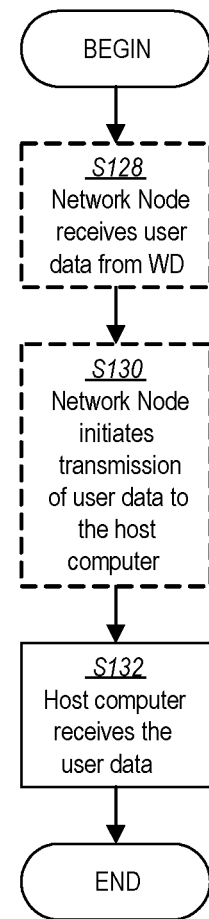
FIG. 9 is a flowchart illustrating exemplary methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
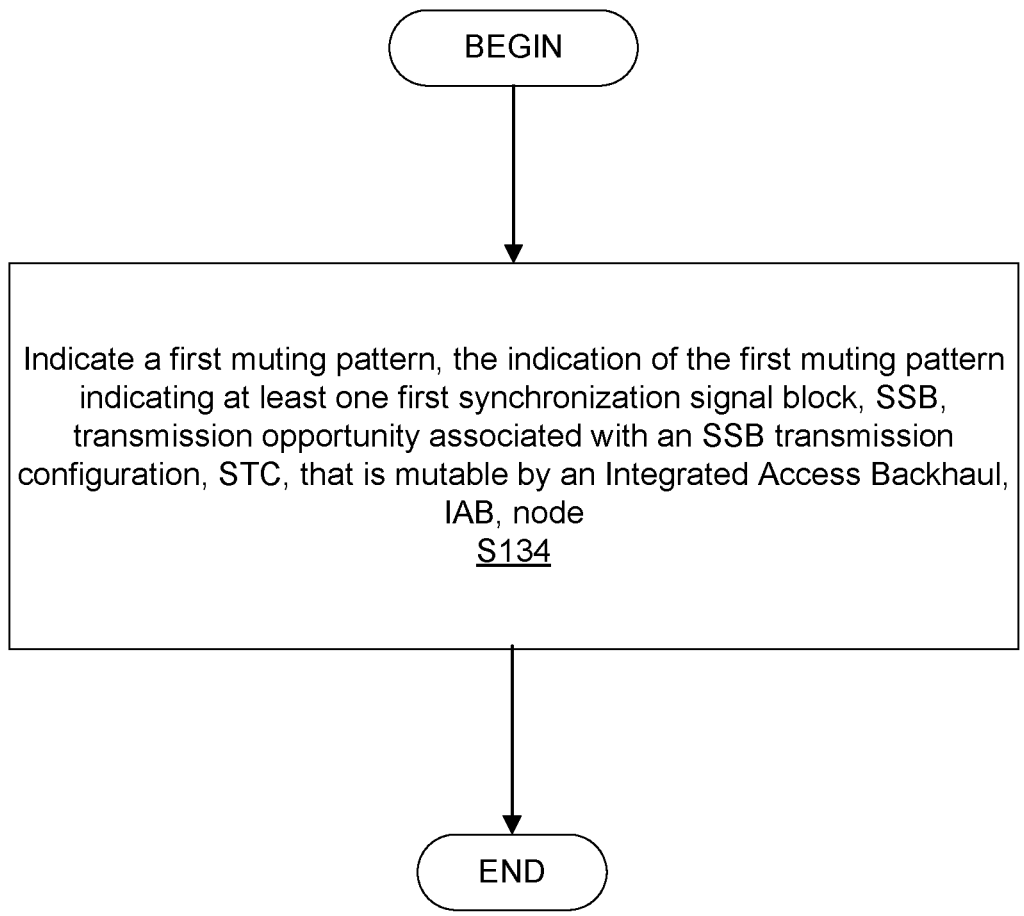
FIG. 10 is a flowchart of an exemplary process in a network node (e.g., OAM, donor-CU or any other network node) for indicator unit according to some embodiments of the present disclosure.

FIG. 10 is a flowchart of an exemplary process in a network node 16 (e.g., in an OAM functionality or a donor-CU or any other network node) for configuring muting patterns according to some embodiments of the present disclosure. One or more Blocks and/or functions and/or methods performed by the network node 16 may be performed by one or more elements of network node 16 such as by indication unit 32 in processing circuitry 68, processor 70, radio interface 62, etc. according to the example method. The example method may include indicating (Block S134), such as via indication unit 32, processing circuitry 68, processor 70 and/or radio interface 62, a first muting pattern. The indication of the first muting pattern indicates at least one first synchronization signal block, SSB, transmission opportunity associated with SSB transmission configuration, STC, that is mutable by an Integrated Access Backhaul, IAB, node.

In some embodiments, the indication of the first muting pattern is provided by at least one muting attribute in the STC. In some embodiments, the STC further indicates at least one second SSB transmission opportunity associated with the STC that is not to be muted. In some embodiments, the at least one first SSB transmission opportunity associated with the STC that is mutable by the IAB node is overlapping in time with at least one first SSB measurement opportunity associated with an SSB measurement timing configuration, SMTC, for the IAB node. In some embodiments, the indication of the first muting pattern indicates a conditional priority for the at least one first SSB transmission opportunity associated with the STC relative to at least one first SSB measurement opportunity associated with an SSB measurement timing configuration, SMTC; the at least one first SSB transmission opportunity overlapping in time with the at least one first SSB measurement opportunity; and the conditional priority is based at least in part on a measurement requirement.

In some embodiments, the at least one first SSB transmission opportunity indicated to have the conditional priority is associated with inter-IAB node cell search or node measurement. In some embodiments, the indication of the first muting pattern indicates an absolute priority for the at least one first SSB transmission opportunity associated with the STC relative to at least one first SSB measurement opportunity associated with an SSB measurement timing configuration, SMTC; the at least one first SSB transmission opportunity overlapping in time with the at least one first SSB measurement opportunity; and the absolute priority not being based on a measurement requirement.

In some embodiments, the at least one first SSB transmission opportunity indicated to have the absolute priority is associated with cell search by user equipments, UEs. In some embodiments, the network node is one of an operations administration and management, OAM, node and a donor IAB node. In some embodiments, the method further includes determining the first muting pattern based at least in part on a second muting pattern. In some embodiments, determining the first muting pattern, such as via indication unit 32, processing circuitry 68, processor 70 and/or radio interface 62, is further based on a relation of SSB transmission opportunities and SSB measurement opportunities associated with a plurality of IAB nodes. In some embodiments, determining, such as via indication unit 32, processing circuitry 68, processor 70 and/or radio interface 62, the first muting pattern is further based on at least one event associated with a muting permission.

In some embodiments, the at least one event associated with the muting permission corresponds to an overlap in time between the at least one first SSB transmission opportunity and at least one first SSB measurement opportunity associated with an SSB measurement timing configuration, SMTC. In some embodiments, the at least one event associated with the muting permission corresponds to at least one of a network change and a state change. In some embodiments, the method further includes determining, such as via indication unit 32, processing circuitry 68, processor 70 and/or radio interface 62, an SSB measurement timing configuration, SMTC, based at least in part on the first muting pattern. In some embodiments, the method further includes negotiating, such as via indication unit 32, processing circuitry 68, processor 70 and/or radio interface 62, a configuration of the first muting pattern with the IAB node. In some embodiments, the method further includes receiving an indication of a third muting pattern. In some embodiments, the indication of the third muting pattern is a notification from the IAB node indicating the third muting pattern used by the IAB node. In some embodiments, the method further includes receiving an indication of the second muting pattern, the indication of the second muting pattern being a configuration by an operations administration and management, OAM, node.

In some embodiments, the indicated first muting pattern corresponds to a synchronization signal block (SSB) transmission configuration (STC). The method may include indicating, such as via indication unit 32, processing circuitry 68, processor 70 and/or radio interface 62, a second muting pattern, the second muting pattern based at least in part on the first muting pattern. The method may include receiving, such as via indication unit 32, processing circuitry 68, processor 70 and/or radio interface 62, an indication of a third muting pattern, the third muting pattern based at least in part on at least one of the indicated second muting pattern and the first muting pattern.

In some embodiments, at least one of the first, second and third muting patterns indicate a subset of SSBs that are permitted to be muted. In some embodiments, the method further includes receiving, such as via indication unit 32, processing circuitry 68, processor 70 and/or radio interface 62, an indication of a prioritization of the STC relative to an SSB-based measurement timing configuration (SMTC). In some embodiments, the second muting pattern is updated, such as via indication unit 32, processing circuitry 68, processor 70 and/or radio interface 62, based at least in part on at least one of a relation of SSB transmission and measurement time patterns between Integrated Access and Backhaul (IAB) network nodes and a network event trigger. In some embodiments, the third muting pattern is a muting pattern used by an IAB Distributed Unit (DU).

Figure 11:
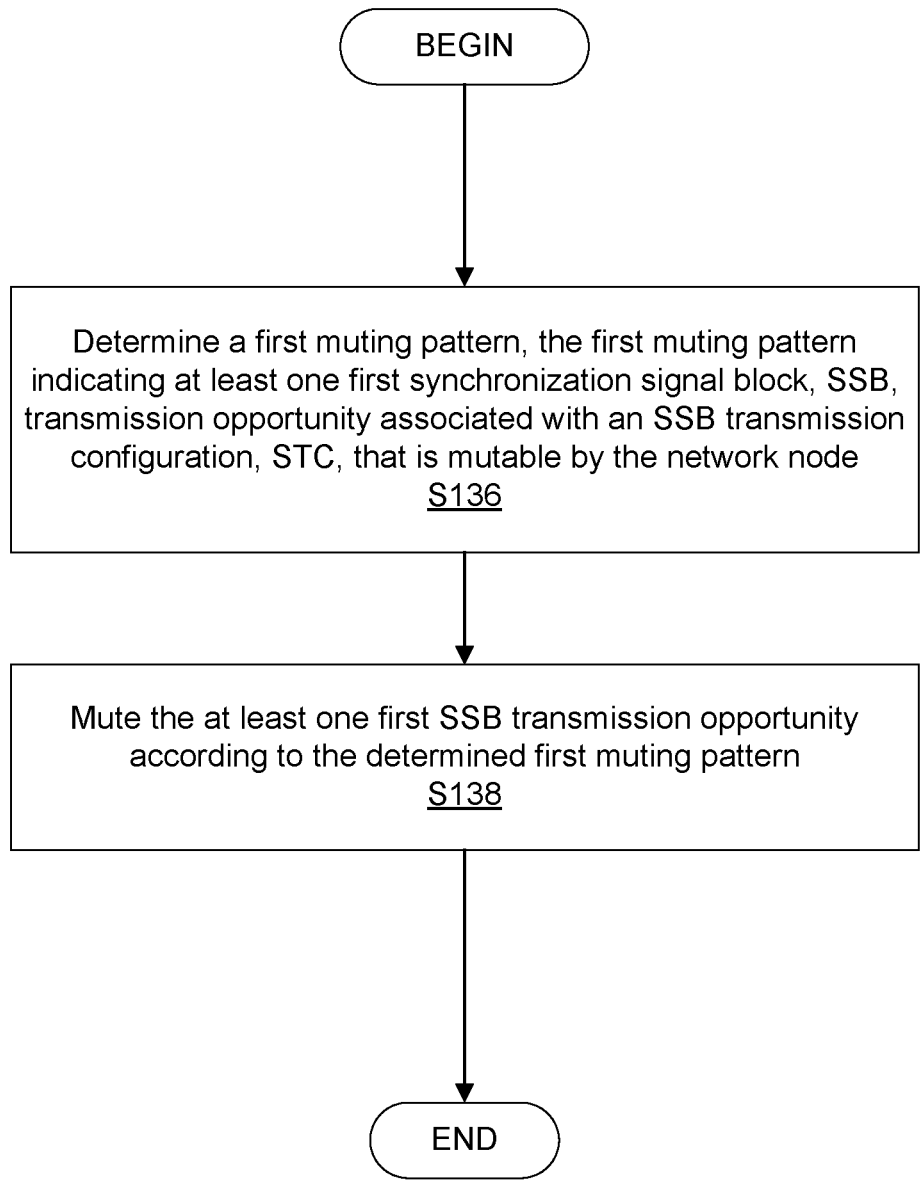
FIG. 11 is a flowchart of an exemplary process in another network node (e.g., IAB-DU or any other network node) for muting unit according to some embodiments of the present disclosure.

FIG. 11 is a flowchart of an exemplary process in another network node 16 (e.g., in an IAB-DU or any other network node) for determining a muting pattern according to some embodiments of the present disclosure. One or more Blocks and/or functions and/or methods performed by network node 16 may be performed by one or more elements of network node 16 such as by muting unit 34 in processing circuitry 68, processor 70, radio interface 62, etc. according to the example method. The example method may include determining (Block S136), such as via muting unit 34, processing circuitry 68, processor 70 and/or radio interface 62, a first muting pattern, the first muting pattern indicating at least one first synchronization signal block, SSB, transmission opportunity associated with an SSB transmission configuration, STC, that is mutable by the network node. The method includes muting (Block S138), such as via muting unit 34, processing circuitry 68, processor 70 and/or radio interface 62, the at least one first SSB transmission opportunity according to the determined first muting pattern.

In some embodiments, the at least one first SSB transmission opportunity associated with the STC that is mutable by the network node is overlapping in time with at least one first SSB measurement opportunity associated with an SSB measurement timing configuration, SMTC. In some embodiments, the method further includes receiving, such as via muting unit 34, processing circuitry 68, processor 70 and/or radio interface 62, an indication of a priority of the at least one first SSB transmission opportunity associated with the STC relative to at least one first SSB measurement opportunity associated with an SSB measurement timing configuration, SMTC.

In some embodiments, the priority is a conditional priority based at least in part on a measurement requirement. In some embodiments, the at least one first SSB transmission opportunity indicated to have the conditional priority is associated with inter-IAB node cell search or node measurement. In some embodiments, the priority is an absolute priority that is not based on a measurement requirement. In some embodiments, the at least one first SSB transmission opportunity indicated to have the absolute priority is associated with cell search by user equipments, UEs. In some embodiments, the method further includes receiving an indication of a second muting pattern; and determining the first muting pattern, such as via muting unit 34, processing circuitry 68, processor 70 and/or radio interface 62, is based at least in part on the second muting pattern, the second muting pattern indicating the at least one first SSB transmission opportunity associated with the STC that can be muted by the network node.

In some embodiments, the second muting pattern is based at least in part on at least one of a relation of SSB transmission opportunities and SSB measurement opportunities associated with a plurality of IAB nodes and at least one event associated with a muting permission. In some embodiments, determining the first muting pattern, such as via muting unit 34, processing circuitry 68, processor 70 and/or radio interface 62, is based further on a third muting pattern, the third muting pattern indicated in the STC. In some embodiments, the second muting pattern is different from and based at least in part on the third muting pattern.

In some embodiments, determining the first muting pattern, such as via muting unit 34, processing circuitry 68, processor 70 and/or radio interface 62, is based further on at least one of a measurement requirement, a traffic demand and an operating condition. In some embodiments, the method further includes indicating, such as via muting unit 34, processing circuitry 68, processor 70 and/or radio interface 62, the first muting pattern used by the network node 16 to mute the at least one first SSB transmission opportunity to a second network node. In some embodiments, the method further includes negotiating, such as via muting unit 34, processing circuitry 68, processor 70 and/or radio interface 62, a configuration of the first muting pattern with the second network node. In some embodiments, the network node 16 is an Integrated Access Backhaul, IAB, node comprising a mobile termination, MT, function and a distributed unit, DU, function, and the MT and DU functions are associated with a half-duplex constraint for SSB transmissions.

In some embodiments, the method includes receiving, such as via muting unit 34, processing circuitry 68, processor 70 and/or radio interface 62, an indication of a first muting pattern corresponding to a synchronization signal block (SSB) transmission configuration (STC). The method may include receiving, such as via muting unit 34, processing circuitry 68, processor 70 and/or radio interface 62, an indication of a second muting pattern, the second muting pattern based at least in part on the first muting pattern. The method may include determining, such as via muting unit 34, processing circuitry 68, processor 70 and/or radio interface 62, a third muting pattern, the third muting pattern based at least in part on at least one of the indicated second muting pattern and the first muting pattern. The method may include muting, such as via muting unit 34, processing circuitry 68, processor 70 and/or radio interface 62, an SSB transmission according to the determined third muting pattern.

In some embodiments, at least one of the first, second and third muting patterns indicate a subset of SSBs that are permitted to be muted. In some embodiments, the method further includes receiving, such as via muting unit 34, processing circuitry 68, processor 70 and/or radio interface 62, an indication of a prioritization of the STC relative to an SSB-based measurement timing configuration (SMTC). In some embodiments, the second muting pattern is based at least in part on at least one of a relation of SSB transmission and measurement time patterns between Integrated Access and Backhaul (IAB) network nodes and a network event trigger. In some embodiments, the third muting pattern is a muting pattern used by an IAB Distributed Unit (DU).

Having described the general process flow of arrangements of the disclosure and having provided examples of hardware and software arrangements for implementing the processes and functions of the disclosure, the sections below provide details and examples of arrangements for determining a muting pattern of a synchronization signal block (SSB) transmission for Integrated Access and Backhaul (IAB) node measurement, which may be implemented by the network node 16 (e.g., IAB network node, IAB donor network node and/or OAM network node), wireless device 22 and/or host computer 24.

In some embodiments, the SSB transmission and measurement configurations for inter-node measurements can be determined in a centralized manner, such as in a network function. In some embodiments of this disclosure, the network function (NF) may be referred to as, for example, a center unit which provides configurations for SSB transmission and/or measurement according to one or more of the arrangements disclosed herein. The network function can be located, for example:

at a network node 16 in the RAN (for example an IAB donor-CU), or
as a separate function residing in the core network, such as a core, network node 16 (for example the Operation, Administration and Management (OAM) function).

In other embodiments, the NF may be present in another type of network node 16.

In some embodiments, an IAB network node-DU 16 can be configured with zero, one or multiple STCs to transmit, for example, Type-1B node-measurement (NM) SSBs, and at least one or more of the following information may be provided in each STC, for example:

SSB center frequency;
SSB subcarrier spacing;
SSB transmission periodicity;
SSB transmission timing offset in half frame(s);
The index of SSBs to transmit; and/or
The physical cell identifier (ID);

In some embodiments, the DU and MT configuration of STC (SSB transmission configuration) and MeasObj (Measurement Object)/SMTC (SSB-based Measurement Time Configuration) may be determined, configured, indicated and/or provided (e.g., to IAB network node-DUs 16) in a coordinated manner to enable inter-node SSB measurements (e.g., by IAB network node-MTs) while not violating the half-duplex constraint. Potential collisions between STC and SMTC time locations may be handled. In some embodiments, when there is a collision (e.g., in the time domain between an SSB transmission opportunity associated with an STC and an SSB measurement opportunity associated with an SMTC), it may be an IAB internal decision (e.g., at IAB network node 16) to prioritize SSB transmission or measurement based on, for example, diverse performance requirements and other conditions. A typical situation may be, for example:

The NF (e.g., at OAM network node, IAB donor network node) has no information about which SSB transmission(s) will eventually be muted by each IAB network node 16; and/or
Each IAB network node 16 has no information about whether there will be any SSB transmitted or not by one or more other IAB network node-DUs 16 during a certain SMTC window (due to muting by such one or more other IAB network nodes 16).

Figure 12:
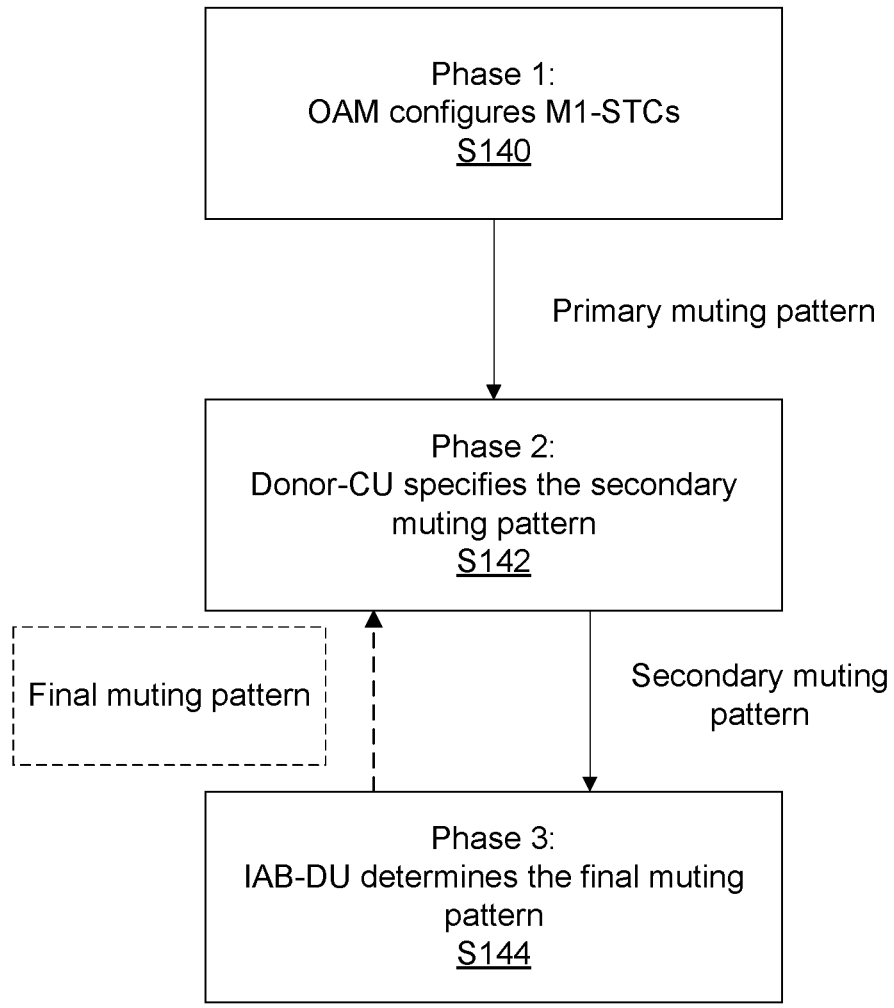
FIG. 12 illustrates an example flow chart showing the determination of the muting pattern in three phases (dashed arrow representing a feedback from the IAB-DU to the donor-CU on the final muting pattern to support the optimized measurement configuration of other nodes) according to some embodiments of the present disclosure.

Given these uncertainties, it may be challenging for an IAB network node 16 to make a proper muting decision, especially if collision between SSB transmission and measurement occurs in multiple time locations. Therefore, in some embodiments, muting patterns may be generated or determined in a coordinated manner, e.g., between various IAB network nodes 16 and/or network functions. According to some embodiments of the present disclosure, the determination of the muting pattern can be performed in at least three phases (as illustrated in FIG. 12 for example):

Phase 1: The primary muting pattern is specified/indicated by the NF (e.g., at OAM network node, IAB donor network node) in the network node 16, mainly based on the network planning.
Phase 2: The secondary muting pattern may be defined by a Coordinating-Function (CF) (e.g., at OAM network node, IAB donor network node), based on the primary muting pattern. The pattern refinement may be based on various muting triggering events and/or the relations between the neighbor IAB network nodes 16.
Phase 3: The final muting pattern may be determined by an IAB network node-DU in a network node 16, based on the secondary muting pattern. The pattern determining (e.g., refinement) may be based on the IAB network node 16 capability and/or the network operation condition.

The CF can be, for example:
part of a network node 16 in the RAN, for example in an IAB donor network node or an IAB network node;
as such, the CF (e.g., at OAM network node, IAB donor network node) may be located in or be part of an IAB network node-CU 16, particularly an IAB donor network node-CU 16;
a separate function residing in the core network, such as a core, network node 16; and/or be a sub-functionality in an overall IAB OAM system, where an OAM client in the IAB network node 16 may control the MT and/or DU behavior.

In some embodiments, the CF may be present in another type of network node 16.

In the following, to simplify understanding of the examples, it may be assumed that the CF is located in and/or is part of the donor-CU in an IAB donor network node 16.

FIG. 12 shows an example flowchart illustrating the determination of the muting pattern in three phases according to one embodiment. The dashed arrow illustrates a feedback from the IAB network node-DU to the IAB donor network node-CU on the final muting pattern to support the optimized measurement configuration of other IAB network nodes 16. A more detailed description of an example of the three phases is provided below.

Primary Muting Pattern (Phase 1)

In some embodiments, the primary muting pattern, configured by the NF (e.g., at OAM network node, IAB donor network node), may include and/or indicate one or more SSB transmission opportunities that potentially or conditionally may be muted by a configured IAB network node-DU 16, which can be a subset of the NM SSBs. This may be performed, for example, by including a muting attribute in the STC parameters to indicate whether or not one or more SSB transmissions defined by the STC can be muted, such as, for example:

M0-STC: The SSB transmission cannot be muted, i.e., an instruction that the SSB is to be transmitted; and/or M1-STC: The SSB transmission can be muted, i.e., the SSB does not need to be transmitted if the IAB network node-MT 16, e.g., has to measure on an SSB that is time-wise overlapping with the SSB configured for transmission at the IAB netowrk node's 16 DU.

Some purposes of the muting attribute are to, for example:

Limit the number of SSBs which can be muted e.g., by the IAB network node-DU 16, and thereby to reduce the measurement uncertainty for the IAB donor network node-CU in the measurement configuration (e.g., SMTC);

Indicate the SSBs (e.g., SSB transmission opportunities) which are possible to negotiate with the IAB donor network node-CU 16 when, for example, there is a desire for the IAB netowrk node-DU 16 to mute the SSB transmission opportunity; and/or Enable flexible prioritization rules at the IAB network node-DU 16 by indicating the priority between the STCs and SMTCs, particularly for SSB transmission opportunities/configurations overlapping in time.

In general, the selection of STC and SMTC patterns, and thereby the priority of STC and SMTC relative to one another, may be configurable with respect to the network size and topology. In special cases where single STC and/or single SMTC are configured, simple prioritization rules can be applied at the IAB network node-DU 16 to solve the time domain conflict. However, configurations with single STC and/or single SMTC often lack flexibility and robustness. In order to serve varied network sizes and topologies, it has been considered that SSBs can be transmitted/measured over multiple half frames (HFs). The prioritization rules may quickly become complex if many network nodes 16 with varied configurations are involved. In some embodiments, in order to enable a flexible implementation of the prioritization rules, the muting attribute can be used to indicate the priority between STC and SMTC, as, for example:

M0-STC: STC has the priority over SMTC (e.g., if they are overlapping in the time domain) regardless of the fulfilment of the measurement requirement (e.g., absolute priority); and/or M1-STC: SMTC has the conditional priority over STC if, for example, there is a measurement requirement (e.g., a certain number of measurements configured according to the SMTC are required).

Figure 13:
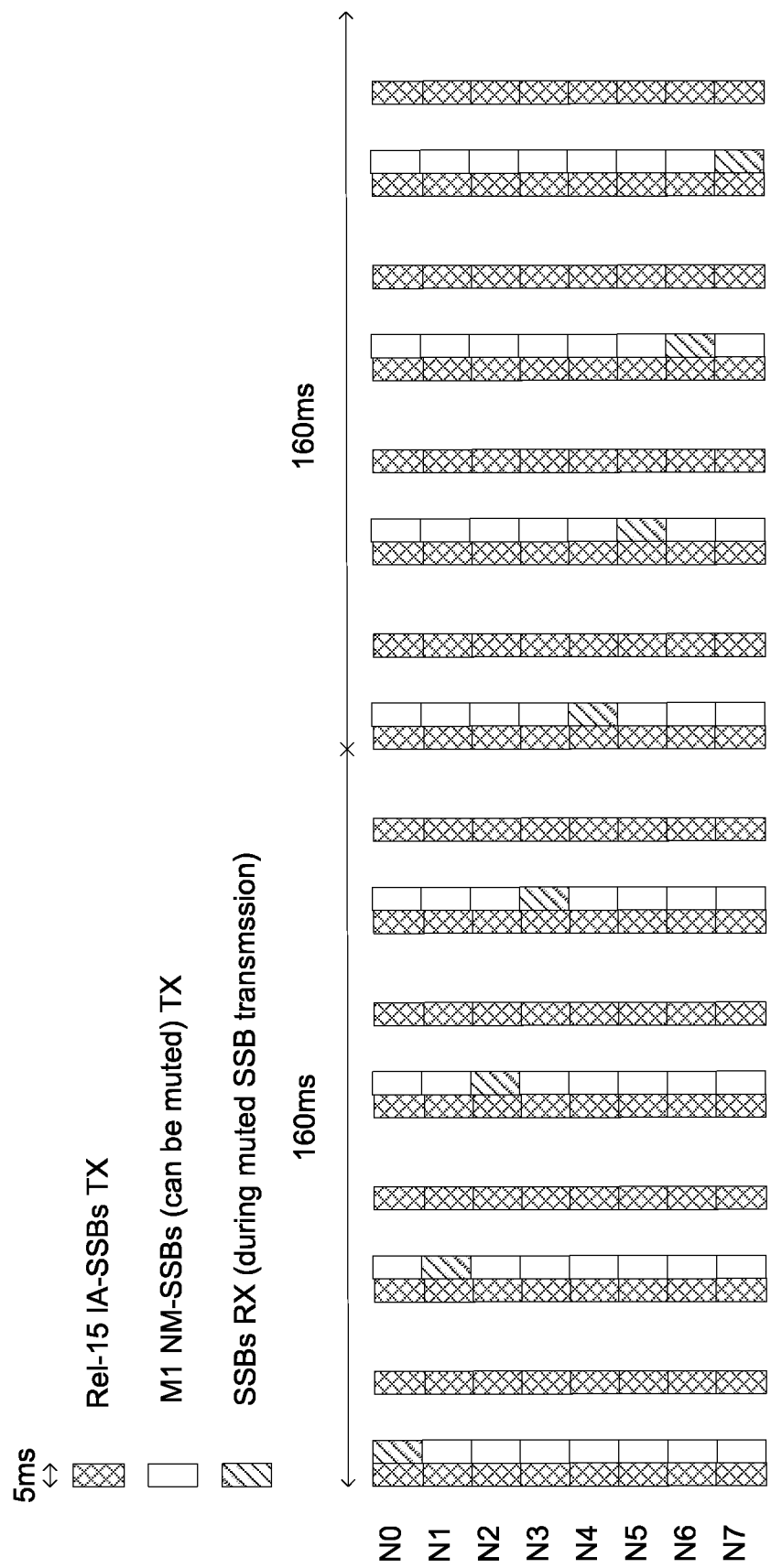
FIG. 13 illustrates an example in which M1-STC is configured for a group of IAB network nodes and SMTC has the priority over SSB transmission configuration (STC) according to some embodiments of the present disclosure.
Figure 14:
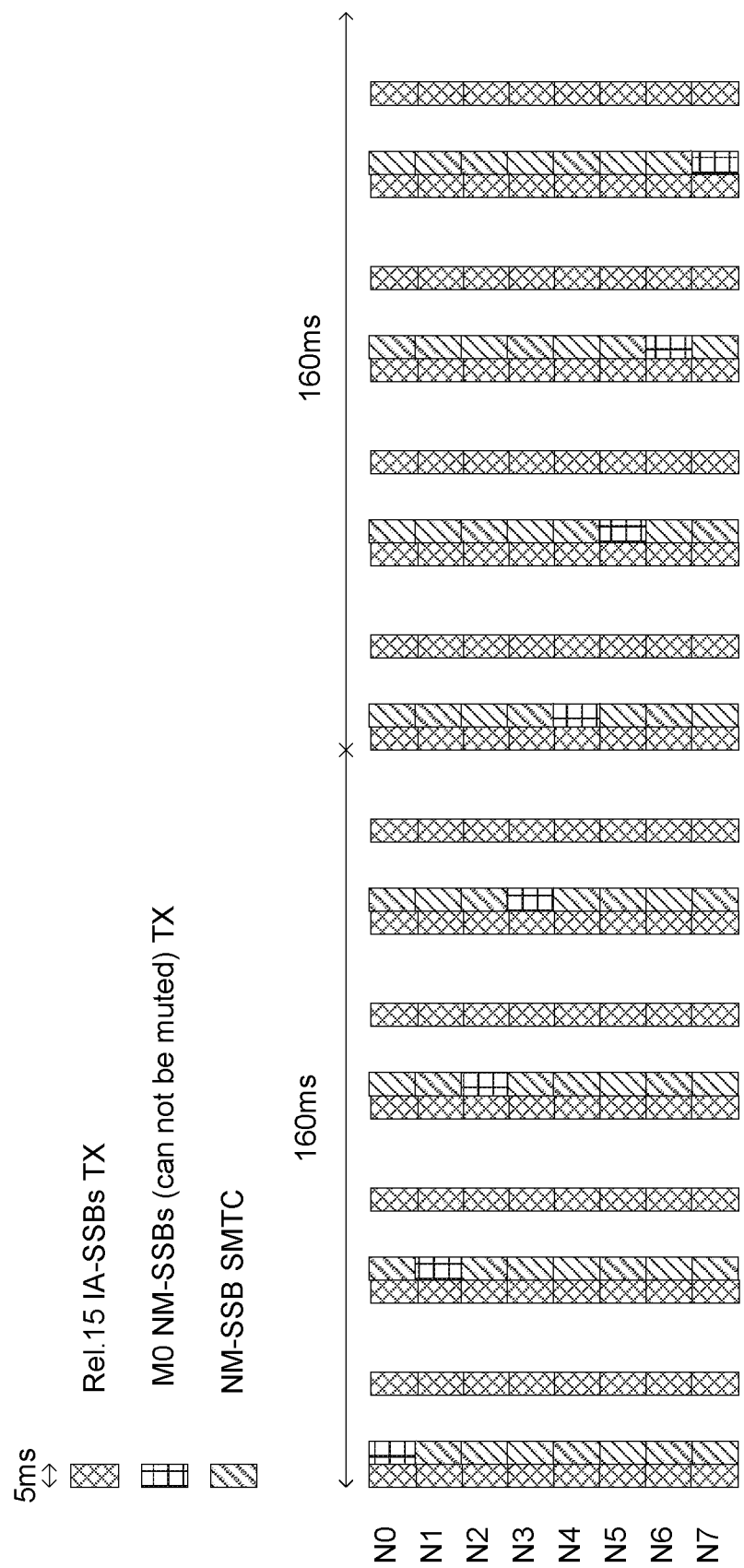
FIG. 14 illustrates an example in which M0-STC is configured for a group of IAB network nodes and STC has the priority over the SMTC according to some embodiments of the present disclosure.

In FIGS. 13 and 14, two examples are provided to illustrate some embodiments. FIG. 13 illustrates a group of 8 IAB network nodes 16 (N0-N7) configured with M1-STCs for inter-IAB network node measurement and in this example the SMTC (SSB measurement timing configuration) has the priority over the STC (SSB transmission configuration) since for each IAB network node 16 the ratio between measurement and transmission opportunities is 1:7. In FIG. 14, a group of 8 IAB network nodes 16 (N0-N7) are illustrated as configured with M0-STCs for inter-IAB network node measurement, which means that the STC has the priority over SMTC (e.g., overlapping in time). In this example, for each IAB network node 16, the ratio between measurement and transmission opportunities is 7:1.

In some embodiments, the primary muting pattern can be updated for example when the network topology is changed.

Secondary Muting Pattern (Phase 2)

One reason for introducing muting is to enable inter-IAB network node measurement among a group of IAB network nodes 16 by providing more orthogonal measurement opportunities, as compared to existing arrangements. It may also be useful for an IAB network node 16 to fulfill its own measurement requirement, and to support the other IAB network nodes 16 to accomplish their measurement tasks. Hence, in some embodiments, it may be preferred that the IAB donor network node-CU 16 has good knowledge about the time domain patterns of all managed IAB network nodes 16 on SSB transmission, measurement and/or muting, since the IAB donor network node-CU may be responsible for configuring inter-IAB network node measurements (e.g., SMTC). From the point of view of overall network performance, it is reasonable to allow the IAB donor network node-CU 16 to provide information of possible/conditional muting occasions of the NM SSBs for each managed IAB network node 16. In particular, the IAB donor network node-CU 16 may define the secondary muting pattern according to one or more of:

the relation of SSB transmission and measurement time patterns between IAB network nodes 16; and/or the events which are granted with muting permissions.

Below are two examples events in which SSB transmission could be muted (e.g., by an IAB network node-DU 16):

1. When the IAB donor network node-CU 16 configures SSB measurement (e.g., SMTC), muting SSB transmission opportunities may be allowed if there is a time collision between SMTC and M1-STC.

2. In certain time resources (e.g., time slots), the SSB transmission opportunity may be muted (e.g., by an IAB network node-DU 16) in order to schedule some critical tasks if the IAB donor network node-CU 16 determines that these SSBs are not measured by other IAB network nodes 16. A critical task could be, for example, a control signal that indicates sudden network changes (such as radio link failure) or informs about network node 16 internal states.

In some embodiments, an update of the secondary muting pattern could be enabled, for example, when the IAB donor network node-CU 16 configures a new measurement request. For example, the IAB donor network node-CU 16 may determine an SMTC based on the updated muting pattern.

According to some embodiments, a muting permission can also be initialized by the IAB network node-DU 16 and may take effect only upon an approval from an IAB donor network node-CU 16. In some embodiments, this may imply that the IAB network node-DU 16 may always negotiate with the IAB donor network node-CU 16 about muting permissions to M1-SSBs which are not in the secondary muting pattern. Then, it may be an IAB donor network node-CU's 16 internal decision to reject or grant the muting request.

Final Muting Pattern (Phase 3)

In some embodiments, the final muting pattern is determined by the IAB network node-DU 16 and/or the final muting pattern is used by the IAB network node-DU 16 to decide whether to transmit or mute SSBs.

In some embodiments, the OAM functionality and donor-CU may not have full knowledge about the IAB network node-DU's capability and the real-time operation condition. The primary and the secondary muting patterns may define, typically with redundancy, an approximate set of SSBs which can be muted. A muting pattern with many possible muting occasions implies increased difficulties for the donor-CU to coordinate inter-IAB node measurements for all managed IAB network nodes 16. The uncertainty for the neighbor IAB network nodes 16 to fulfill measurement requirements grows with the increasing muting occasions. From the view of the efficient inter-IAB node measurement, the IAB network node-DU 16 may be configured to generally avoid muting SSB transmission as much as possible (e.g., while also following the half-duplex constraint). Among the M1-SSBs in the secondary muting pattern, the IAB network node-DU 16 may be able to further down select those SSBs/SSB transmission opportunities that will eventually get muted (i.e., not transmitted), according to the IAB network node-DU 16 capability to fulfill the measurement requirement and/or traffic demands, and the current operation conditions.

In some embodiments, the final muting pattern may be different from the primary and/or secondary muting patterns. In some embodiments, the final muting pattern is the same as the secondary muting pattern, such as, for example, when the IAB network node-DU 16 determines to follow the secondary muting pattern exactly. Similarly, in some embodiments, the final muting pattern may be the same as the primary muting pattern, such as, for example, when the IAB donor network node-CU 16 and the IAB network node-DU 16 determines to follow the transmission configurations of the OAM network node 16.

Figure 15:
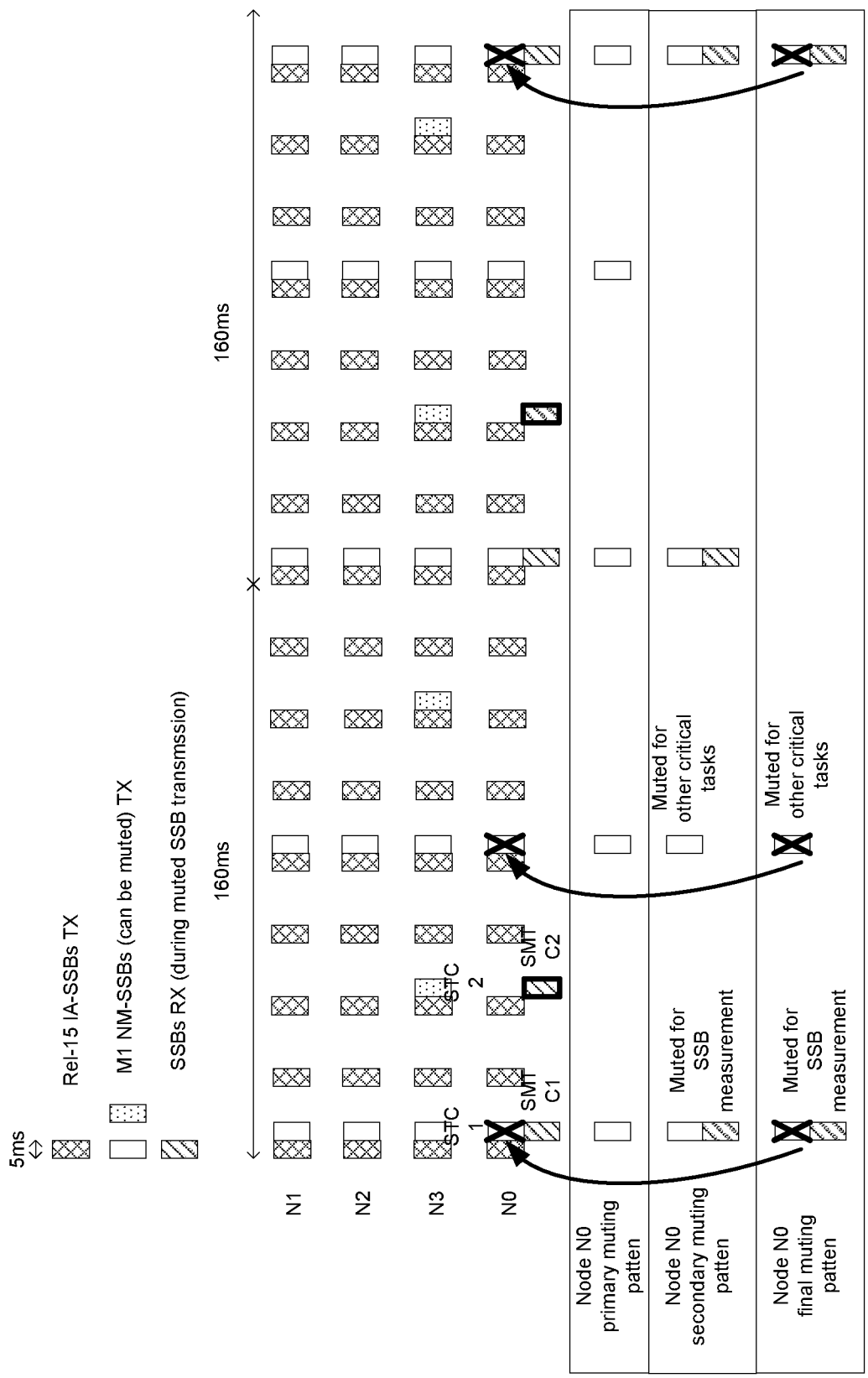
FIG. 15 illustrates an example determination of a primary, a secondary and a final muting pattern for the IAB network node N0 according to some embodiments of the present disclosure.

FIG. 15 illustrates an example of an iterative determination of the muting pattern for the network node 16 N0 according to the example three phase/step process. The shaded boxes representing the Rel-15 SSBs (as indicated in the legend in FIG. 15) target the WD 22 initial access which cannot be muted (M0-SSBs). FIG. 15 also shows the boxes/resources representing the Type 1-B NM-SSBs (in this case on of type M1-SSBs, as indicated in the legend). First, the OAM network node 16 configures the primary muting pattern which is a M1-STC. The secondary muting pattern specified by the IAB donor network node-CU 16 may be a result of two different muting permissions, the first muting permission based on a possible collision with an SMTC configuration and the second permission may be that the SSB transmission cannot be measured by any other network node 16. In the final step of the example process, the IAB network node 16 N0 refines the muting pattern by deselecting the M1-SSBs that do not get muted.

The so called "final" muting pattern may be considered the muting pattern that is eventually used at the IAB network node-DU 16. According to an embodiment, the actual muting pattern may be fed back to the IAB donor network node-CU 16. For the IAB donor network node-CU 16, the access to the true/final muting pattern (that is actually used by the IAB network node-DU 16) can significantly reduce the coordination complexity among the IAB network nodes 16 managed by the IAB donor network node-CU 16. As a matter of fact, to better coordinate SSB transmission and measurement, the IAB donor network node-CU 16 may keep track of all three muting patterns (i.e., primary, secondary and final, according to FIG. 5, for example, resulting from phase 1, 2 and 3, respectively) for all the IAB network nodes 16 that are managed by the IAB donor network node-CU 16.

Some embodiments may include one or more of the following:

Embodiment 1

In embodiment 1, the final muting pattern can be fed back to the IAB donor network node-CU 16 to support an optimized measurement for other IAB network nodes 16. For the IAB donor network node-CU 16, the access to the true/final muting pattern can reduce the coordination complexity among managed IAB network nodes 16.

Embodiment 2

In embodiment 2a: For the IAB network node-DU 16 (provided for example by a network node 16), the overall muting pattern that includes all SSBs which can be muted could be irregular and complicated, given multiple STCs/SMTCs and diverse muting triggered events. In some aspects, since one multi-half-frame (HF) muting pattern can always be described by multiple single-HF muting patterns, with different periodicity, the signaling of muting pattern can be based on single half-frames, with the configuration parameters, such as, for example, one or more of:

1. Periodicity;
2. Offset in half-frames; and/or
3. SSB indices.

In embodiment 2b: The muting pattern may be aperiodic.

In embodiment 2c: Each muting pattern can be associated to one STC.

In embodiment 2d: One muting pattern can contain a mixture of SSBs from various STCs.

Embodiment 3

In embodiment 3a: The muting patterns can be per IAB network node 16.

In embodiment 3b: The muting patterns can be per IAB network node-DU 16.

In embodiment 3c: The muting patterns can be per cell of an IAB network node-DU 16.

Embodiment 4

In embodiment 4a: The reconfiguration/update of the muting pattern can be initialized by the OAM functionality, as, for example, according to a node path of:

OAM→IAB donor-CU→IAB DU.

In embodiment 4b: The reconfiguration/update of the muting pattern can be initialized by the IAB donor network node-CU (provided for example by a network node 16), as, for example, according to a node path of:

IAB donor-CU→IAB DU.

In embodiment 4c: The reconfiguration/update of the muting pattern can be initialized by the IAB network node-DU 16, as, for example, according to a node path of:

IAB-DU→IAB donor-CU→IAB DU.

In embodiment 4d: A muting permission which is initialized by the IAB network node-DU 16 may take effect only upon an approval from the IAB donor network node-CU 16. This may mean that the IAB network node-DU 16 can always negotiate with the IAB donor network node-CU 16 about muting permissions to M1-SSBs which are not in the secondary muting pattern. Then, it is an IAB donor network node-CU's 16 internal decision to reject or grant the muting request.

Embodiment 5

In embodiment 5a: The muting patterns can be reused based on location information such as distance between the sites.

In embodiment 5b: The muting patterns can be reused for different IAB donor network node-CUs 16.

In embodiment 5c: The muting patterns can be reused based on network topology information, such as the hop level, odd/even nodes, etc.

Embodiment 6

In this embodiment, the IAB donor network node-CU 16 can indicate to the IAB network node-DU 16 about the secondary muting pattern over, for example, the F1 interface.

Embodiment 7

In this embodiment, the IAB donor network node-CU 16 may exchange the muting pattern with other IAB donor network node-CUs 16 to coordinate topology adaption/node measurement between different IAB donor network node-CUs 16 over the Xn interface.

Embodiment 8

In this embodiment, the IAB donor network node-CU 16 can inform the OAM functionality about the secondary and final muting patterns.

Embodiment 9

In embodiment 9a: The signaling of muting pattern between the OAM network node, IAB donor network node-CU and IAB network node-DU can be automated.

In embodiment 9b: The signaling of muting pattern between the OAM network node, IAB donor network node-CU and IAB network node-DU can be event-trigged.

Embodiment 10

In this embodiment, the muting pattern determination can be based on the IAB network topology including neighbor node/cell relationship, multi-hop levels, propagation channels, neighbor IAB-networks relationship, etc.

Embodiment 11

In this embodiment, the IAB donor network node-CU 16 may keep track of all three muting patterns (i.e., primary, secondary and final according to e.g. FIG. 12 for example, resulting from phase 1, 2 and 3, respectively) for its managed IAB network nodes 16.

Some embodiments may include one or more of the following:

Embodiment A1. A network node configured to communicate with a wireless device (WD), the network node configured to, and/or comprising a radio interface and/or comprising processing circuitry configured to one or more of:

indicate a first muting pattern corresponding to a synchronization signal block (SSB) transmission configuration (STC);

indicate a second muting pattern, the second muting pattern based at least in part on the first muting pattern; and/or receive an indication of a third muting pattern, the third muting pattern based at least in part on at least one of the indicated second muting pattern and the first muting pattern.

Embodiment A2. The network node of Embodiment A1, wherein at least one of the first, second and third muting patterns indicate a subset of SSBs that are permitted to be muted.

Embodiment A3. The network node of Embodiment A1, wherein the network node and/or the radio interface and/or the processing circuitry is further configured to receive an indication of a prioritization of the STC relative to an SSB-based measurement timing configuration (SMTC).

Embodiment A4. The network node of Embodiment A1, wherein the second muting pattern is updated based at least in part on at least one of a relation of SSB transmission and measurement time patterns between Integrated Access and Backhaul (IAB) network nodes and a network event trigger.

Embodiment A5. The network node of Embodiment A1, wherein the third muting pattern is a muting pattern used by an IAB Distributed Unit (DU).

Embodiment B1. A method implemented in a network node, the method comprising one or more of:

indicating a first muting pattern corresponding to a synchronization signal block (SSB) transmission configuration (STC);

indicating a second muting pattern, the second muting pattern based at least in part on the first muting pattern; and/or receiving an indication of a third muting pattern, the third muting pattern based at least in part on at least one of the indicated second muting pattern and the first muting pattern.

Embodiment B2. The method of Embodiment B1, wherein at least one of the first, second and third muting patterns indicate a subset of SSBs that are permitted to be muted.

Embodiment B3. The method of Embodiment B1, further comprising receiving an indication of a prioritization of the STC relative to an SSB-based measurement timing configuration (SMTC).

Embodiment B4. The method of Embodiment B1, wherein the second muting pattern is updated based at least in part on at least one of a relation of SSB transmission and measurement time patterns between Integrated Access and Backhaul (IAB) network nodes and a network event trigger.

Embodiment B5. The method of Embodiment B1, wherein the third muting pattern is a muting pattern used by an IAB Distributed Unit (DU).

Embodiment C1. A network node configured to communicate with a wireless device (WD), the network node configured to, and/or comprising a radio interface and/or comprising processing circuitry configured to one or more of:

receive an indication of a first muting pattern corresponding to a synchronization signal block (SSB) transmission configuration (STC);

receive an indication of a second muting pattern, the second muting pattern based at least in part on the first muting pattern;

determine a third muting pattern, the third muting pattern based at least in part on at least one of the indicated second muting pattern and the first muting pattern; and/or mute an SSB transmission according to the determined third muting pattern.

Embodiment C2. The network node of Embodiment C1, wherein at least one of the first, second and third muting patterns indicate a subset of SSBs that are permitted to be muted.

Embodiment C3. The network node of Embodiment C1, wherein the network node and/or the radio interface and/or the processing circuitry is further configured to receive an indication of a prioritization of the STC relative to an SSB-based measurement timing configuration (SMTC).

Embodiment C4. The network node of Embodiment C1, wherein the second muting pattern is based at least in part on at least one of a relation of SSB transmission and measurement time patterns between Integrated Access and Backhaul (IAB) network nodes and a network event trigger.

Embodiment C5. The network node of Embodiment C1, wherein the third muting pattern is a muting pattern used by an IAB Distributed Unit (DU).

Embodiment D1. A method implemented in a network node, the method comprising one or more of:

receiving an indication of a first muting pattern corresponding to a synchronization signal block (SSB) transmission configuration (STC);

receiving an indication of a second muting pattern, the second muting pattern based at least in part on the first muting pattern;

determining a third muting pattern, the third muting pattern based at least in part on at least one of the indicated second muting pattern and the first muting pattern; and/or muting an SSB transmission according to the determined third muting pattern.

Embodiment D2. The method of Embodiment D1, wherein at least one of the first, second and third muting patterns indicate a subset of SSBs that are permitted to be muted.

Embodiment D3. The method of Embodiment D1, further comprising receiving an indication of a prioritization of the STC relative to an SSB-based measurement timing configuration (SMTC).

Embodiment D4. The method of Embodiment D1, wherein the second muting pattern is based at least in part on at least one of a relation of SSB transmission and measurement time patterns between Integrated Access and Backhaul (IAB) network nodes and a network event trigger.

Embodiment D5. The method of Embodiment D1, wherein the third muting pattern is a muting pattern used by an IAB Distributed Unit (DU).

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | 3rd Generation Partnership Project |
| 5G | 5th Generation |
| ANR | Automatic Neighbour Relation |
| CD-SSB | Cell Defining SSB |
| CGI | Cell Global Identifier |
| CU | Central Unit |
| DU | Distributed Unit |
| eNB | E-UTRAN NodeB |
| EN-DC | E-UTRAN-NR Dual Connectivity |
| FR | Frequency Range |
| GSNC | Global Synchronization Channel Number |
| ID | Identity/Identifier |
| LTE | Long Term Evolution |
| LSB | Least Significant Bit |
| MCC | Mobile Country Code |
| MeasObj | Measurement Object (RRC) |
| MIB | Master Information Base |
| MNC | Mobile Network Code |
| NGC | 5GC; 5G Core Network |
| NR | New Radio (5G) |
| NRT | Neighbour Relation Table |
| NR-U | NR Unlicensed |
| OAM | Operation, Administration and Management |
| PBCH | Physical Broadcast Channel |
| PCI | Physical Cell Identity |
| PDCCH | Physical Downlink Control Channel |
| PLMN | Public Land Mobile Network |
| RAT | Radio Access Technology |
| RMSI | Remaining Minimum System Information |
| RRC | Radio Resource Control |
| RSRP | Reference Signal Received Power |
| RSRQ | Reference Signal Received Quality |
| SCS | Subcarrier Spacing |
| SFN | System Frame Number |
| SIB | System Information Block |
| SON | Self-Organizing Network |
| SSB | Synchronization Signal Block |
| TPMF | Time Pattern Management Function |
| TS | Technical Specification |
| UE | User Equipment |
| UTRAN | Universal Terrestrial Radio Access Network |
| Xn | Interface between two gNBs. |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented by an Integrated Access Backhaul, IAB, donor network node, the IAB donor network node being configured to provide wireless devices with an interface to a core network and to provide wireless backhauling functionality to IAB nodes, the method comprising:
   receiving an indication of a first muting pattern, the indication of the first muting pattern being a configuration by an operations administration and management, OAM, node;
   determining a second muting pattern based at least in part on the first muting pattern; and
   indicating the second muting pattern to an IAB node over a wireless backhaul link, the indication of the second muting pattern indicating at least one first synchronization signal block, SSB, transmission opportunity that is mutable by the IAB node, the at least one first SSB transmission opportunity being associated with a SSB transmission configuration, STC, the indication of the second muting pattern being provided by at least one muting attribute in the STC.

2. The method of claim 1, wherein the STC further indicates at least one second SSB transmission opportunity associated with the STC that is not to be muted.

3. The method of claim 1, wherein the indication of the second muting pattern indicates a conditional priority for the at least one first SSB transmission opportunity associated with the STC relative to at least one first SSB measurement opportunity associated with an SSB measurement timing configuration, SMTC;
   the at least one first SSB transmission opportunity overlapping in time with the at least one first SSB measurement opportunity; and
   the conditional priority is based at least in part on a measurement requirement.

4. The method of claim 1, wherein determining the second muting pattern is further based on a relation of SSB transmission opportunities and SSB measurement opportunities associated with a plurality of IAB nodes.

5. The method of claim 1, wherein determining the second muting pattern is further based on at least one event associated with a muting permission.

6. The method of claim 1, further comprising determining an SSB measurement timing configuration, SMTC, based at least in part on the second muting pattern.

7. The method of claim 1, further comprising negotiating a configuration of the second muting pattern with the IAB node.

8. The method of claim 1, further comprising receiving, from the IAB node, an indication of an actual muting pattern used by the IAB node.

9. A method implemented by an Integrated Access Backhaul, IAB, node, the IAB node comprising a mobile termination, MT, function and a distributed unit, DU, function, the MT and DU functions being associated with a half-duplex constraint for synchronization signal block SSB, transmissions, the method comprising:
   receiving, from an IAB donor network node over a wireless backhaul link, an indication of a second muting pattern determined by the IAB donor network node, the second muting pattern indicating at least one first synchronization signal block, SSB, transmission opportunity that is mutable by the IAB node, the at least one first SSB transmission opportunity being associated with an SSB transmission configuration, STC, the indication of the second muting pattern being provided by at least one muting attribute in the STC;

determining an actual muting pattern based at least in part on the second muting pattern, the actual muting pattern indicating a subset of the at least one first SSB transmission opportunity associated with the STC, the indicated subset of the at least one first SSB transmission opportunity being mutable by the IAB node; and muting the subset of the at least one first SSB transmission opportunity according to the determined actual muting pattern.

10. The method of claim 9, wherein the at least one first SSB transmission opportunity that is mutable by the IAB node is overlapping in time with at least one first SSB measurement opportunity associated with an SSB measurement timing configuration, SMTC.

11. The method of claim 9, further comprising:
receiving, over the wireless backhaul link, an indication of a priority of the at least one first SSB transmission opportunity associated with the STC relative to at least one first SSB measurement opportunity associated with an SSB measurement timing configuration, SMTC.

12. The method of claim 11, wherein the priority is a conditional priority based at least in part on a measurement requirement.

13. The method of claim 9, wherein the second muting pattern is based at least in part on at least one of a relation of SSB transmission opportunities and SSB measurement opportunities associated with a plurality of IAB nodes and at least one event associated with a muting permission.

14. The method of claim 9, wherein determining the actual muting pattern is based further on at least one of a measurement requirement, a traffic demand and an operating condition.

15. The method of claim 9, further comprising indicating the actual muting pattern used by the IAB node to mute the subset of the at least one first SSB transmission opportunity to a second network node.

16. An Integrated Access Backhaul, IAB, donor network node, the IAB donor network node being configured to provide wireless devices with an interface to a core network and to provide wireless backhauling functionality to IAB nodes, the IAB donor network node comprising processing circuitry configured to cause the IAB donor network node to:

receive an indication of a first muting pattern, the indication of the first muting pattern being a configuration by an operations administration and management, OAM, node;

determine a second muting pattern based at least in part on the first muting pattern; and indicate the second muting pattern to an IAB node over a wireless backhaul link, the indication of the second muting pattern indicating at least one first synchronization signal block, SSB, transmission opportunity that is mutable by an IAB node, the at least one first SSB transmission opportunity being associated with a SSB transmission configuration, STC, the indication of the second muting pattern being provided by at least one muting attribute in the STC.

17. An Integrated Access Backhaul, IAB, node, the IAB node configured to perform a mobile termination, MT, function and a distributed unit, DU, function, the MT and DU functions being associated with a half-duplex constraint for synchronization signal block SSB, transmissions, the IAB node comprising processing circuitry configured to cause the IAB node to:

receive, from an IAB donor network node over a wireless backhaul link, an indication of a second muting pattern determined by the IAB donor network node, the second muting pattern indicating at least one first synchronization signal block, SSB, transmission opportunity that is mutable by the IAB node, the at least one first SSB transmission opportunity being associated with an SSB transmission configuration, STC, the indication of the second muting pattern being provided by at least one muting attribute in the STC;

determine an actual muting pattern based at least in part on the second muting pattern, the actual muting pattern indicating a subset of the at least one first SSB transmission opportunity associated with the STC, the indicated subset of the at least one first SSB transmission opportunity being mutable by the IAB node; and mute the subset of the at least one first SSB transmission opportunity according to the determined actual muting pattern.

18. The IAB node of claim 17, wherein the at least one first SSB transmission opportunity that is mutable by the IAB node is overlapping in time with at least one first SSB measurement opportunity associated with an SSB measurement timing configuration, SMTC.

* * * * *